United States Patent
Travis

(10) Patent No.: US 10,107,994 B2
(45) Date of Patent: Oct. 23, 2018

(54) WIDE FIELD-OF-VIEW VIRTUAL IMAGE PROJECTOR

(71) Applicant: Microsoft Technology Licensing, LLC, Redmond, WA (US)

(72) Inventor: Adrian R. L. Travis, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/641,831

(22) Filed: Mar. 9, 2015

(65) Prior Publication Data

US 2015/0177497 A1    Jun. 25, 2015

Related U.S. Application Data

(62) Division of application No. 13/494,722, filed on Jun. 12, 2012, now Pat. No. 9,019,615.

(51) Int. Cl.
*G02B 27/18*    (2006.01)
*G02B 27/10*    (2006.01)
(Continued)

(52) U.S. Cl.
CPC .......... *G02B 13/06* (2013.01); *G02B 5/1814* (2013.01); *G02B 6/34* (2013.01); *G02B 6/42* (2013.01);
(Continued)

(58) Field of Classification Search
USPC ................................................. 359/619–630
See application file for complete search history.

(56) References Cited

U.S. PATENT DOCUMENTS

| 578,325 A | 3/1897 | Fleming |
| 3,600,528 A | 8/1971 | Leposavic |

(Continued)

FOREIGN PATENT DOCUMENTS

| CA | 990023 | 6/1976 |
| CN | 87107536 | 6/1988 |

(Continued)

OTHER PUBLICATIONS

"Examiner's Answer to Appeal Brief", U.S. Appl. No. 13/408,257, Nov. 6, 2015, 23 pages.

(Continued)

*Primary Examiner* — Brandi Thomas
(74) *Attorney, Agent, or Firm* — Alleman Hall Creasman & Tuttle LLP

(57) ABSTRACT

A wide field-of-view virtual image projector includes a rod light guide that is embossed with at least a first diffraction grating and a second diffraction grating that is substantially parallel to the first diffraction grating. The first diffraction grating is configured to receive a first light ray, and to project first diffracted light rays from the rod light guide at a first range of angles. The second diffraction grating is configured to receive a second light ray, and to project second diffracted light rays from the rod light guide at a second range of angles. The virtual image projector further includes a slab light guide configured to receive the first diffracted light rays and the second diffracted light rays, and to diffract the first diffracted light rays and the second diffracted light rays out of the slab light guide to generate a virtual image with a wide field-of view.

20 Claims, 8 Drawing Sheets

(51) Int. Cl.
*G02B 13/06* (2006.01)
*G02B 5/18* (2006.01)
*G02B 27/01* (2006.01)
*G02B 27/00* (2006.01)
*G02B 6/34* (2006.01)
*F21V 8/00* (2006.01)
*G02B 6/42* (2006.01)

(52) U.S. Cl.
CPC ........ *G02B 27/0081* (2013.01); *G02B 27/017* (2013.01); *G02B 27/0172* (2013.01); *G02B 6/0028* (2013.01); *G02B 6/0033* (2013.01); *G02B 6/4298* (2013.01); *G02B 2027/0125* (2013.01); *G02B 2027/0178* (2013.01)

(56) References Cited

U.S. PATENT DOCUMENTS

| | | |
|---|---|---|
| 3,777,082 A | 12/1973 | Hatley |
| 3,879,586 A | 4/1975 | DuRocher et al. |
| 4,046,975 A | 9/1977 | Seeger, Jr. |
| 4,065,649 A | 12/1977 | Carter et al. |
| 4,086,451 A | 4/1978 | Boulanger |
| 4,239,338 A | 12/1980 | Borrelli et al. |
| 4,243,861 A | 1/1981 | Strandwitz |
| 4,302,648 A | 11/1981 | Sado et al. |
| 4,317,013 A | 2/1982 | Larson |
| 4,365,130 A | 12/1982 | Christensen |
| 4,492,829 A | 1/1985 | Rodrique |
| 4,503,294 A | 3/1985 | Matsumaru |
| 4,527,021 A | 7/1985 | Morikawa et al. |
| 4,559,426 A | 12/1985 | Van Zeeland et al. |
| 4,576,436 A | 3/1986 | Daniel |
| 4,577,822 A | 3/1986 | Wilkerson |
| 4,588,187 A | 5/1986 | Dell |
| 4,607,147 A | 8/1986 | Ono et al. |
| 4,615,579 A | 10/1986 | Whitehead |
| 4,651,133 A | 3/1987 | Ganesan et al. |
| 4,735,394 A | 4/1988 | Facco |
| 5,008,497 A | 4/1991 | Asher |
| 5,021,638 A | 6/1991 | Nopper et al. |
| 5,128,829 A | 7/1992 | Loew |
| 5,220,521 A | 6/1993 | Kikinis |
| 5,283,559 A | 2/1994 | Kalendra et al. |
| 5,331,443 A | 7/1994 | Stanisci |
| 5,339,382 A | 8/1994 | Whitehead |
| 5,363,075 A | 11/1994 | Fanucchi |
| 5,375,076 A | 12/1994 | Goodrich et al. |
| 5,406,415 A | 4/1995 | Kelly |
| 5,480,118 A | 1/1996 | Cross |
| 5,491,313 A | 2/1996 | Bartley et al. |
| 5,546,271 A | 8/1996 | Gut et al. |
| 5,548,477 A | 8/1996 | Kumar et al. |
| 5,558,577 A | 9/1996 | Kato |
| 5,661,279 A | 8/1997 | Kenmochi |
| 5,666,112 A | 9/1997 | Crowley et al. |
| 5,681,220 A | 10/1997 | Bertram et al. |
| 5,737,183 A | 4/1998 | Kobayashi et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,842,027 A | 11/1998 | Oprescu et al. |
| 5,861,990 A | 1/1999 | Tedesco |
| 5,874,697 A | 2/1999 | Selker et al. |
| 5,905,485 A | 5/1999 | Podoloff |
| 5,924,555 A | 7/1999 | Sadamori et al. |
| 5,926,170 A | 7/1999 | Oba |
| 5,971,635 A | 10/1999 | Wise |
| 5,999,147 A | 12/1999 | Teitel |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,042,075 A | 3/2000 | Burch, Jr. |
| 6,044,717 A | 4/2000 | Biegelsen et al. |
| 6,046,857 A | 4/2000 | Morishima et al. |
| 6,061,644 A | 5/2000 | Leis |
| 6,108,200 A | 8/2000 | Fullerton |
| 6,128,007 A | 10/2000 | Seybold |
| 6,141,388 A | 10/2000 | Servais et al. |
| 6,178,443 B1 | 1/2001 | Lin |
| 6,188,391 B1 | 2/2001 | Seely et al. |
| 6,195,136 B1 | 2/2001 | Handschy et al. |
| 6,232,934 B1 | 5/2001 | Heacock et al. |
| 6,238,078 B1 | 5/2001 | Hed |
| 6,254,105 B1 | 7/2001 | Rinde et al. |
| 6,279,060 B1 | 8/2001 | Luke et al. |
| 6,300,986 B1 | 10/2001 | Travis |
| 6,329,617 B1 | 12/2001 | Burgess |
| 6,342,871 B1 | 1/2002 | Takeyama |
| 6,344,791 B1 | 2/2002 | Armstrong |
| 6,353,503 B1 | 3/2002 | Spitzer et al. |
| 6,362,861 B1 | 3/2002 | Hertz et al. |
| 6,366,440 B1 | 4/2002 | Kung |
| 6,380,497 B1 | 4/2002 | Hashimoto et al. |
| 6,437,682 B1 | 8/2002 | Vance |
| 6,450,046 B1 | 9/2002 | Maeda |
| 6,469,755 B1 | 10/2002 | Adachi et al. |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,585,435 B2 | 7/2003 | Fang |
| 6,597,347 B1 | 7/2003 | Yasutake |
| 6,600,121 B1 | 7/2003 | Olodort et al. |
| 6,603,408 B1 | 8/2003 | Gaba |
| 6,603,461 B2 | 8/2003 | Smith, Jr. et al. |
| 6,608,664 B1 | 8/2003 | Hasegawa |
| 6,617,536 B2 | 9/2003 | Kawaguchi |
| 6,651,943 B2 | 11/2003 | Cho et al. |
| 6,684,166 B2 | 1/2004 | Bellwood et al. |
| 6,685,369 B2 | 2/2004 | Lien |
| 6,695,273 B2 | 2/2004 | Iguchi |
| 6,704,864 B1 | 3/2004 | Philyaw |
| 6,721,019 B2 | 4/2004 | Kono et al. |
| 6,725,318 B1 | 4/2004 | Sherman et al. |
| 6,774,888 B1 | 8/2004 | Genduso |
| 6,776,546 B2 | 8/2004 | Kraus et al. |
| 6,780,019 B1 | 8/2004 | Ghosh et al. |
| 6,781,819 B2 | 8/2004 | Yang et al. |
| 6,784,869 B1 | 8/2004 | Clark et al. |
| 6,795,146 B2 | 9/2004 | Dozov et al. |
| 6,798,887 B1 | 9/2004 | Andre |
| 6,813,143 B2 | 11/2004 | Makela |
| 6,819,316 B2 | 11/2004 | Schulz et al. |
| 6,833,955 B2 | 12/2004 | Niv |
| 6,847,488 B2 | 1/2005 | Travis |
| 6,856,506 B2 | 2/2005 | Doherty et al. |
| 6,856,789 B2 | 2/2005 | Pattabiraman et al. |
| 6,861,961 B2 | 3/2005 | Sandbach et al. |
| 6,909,354 B2 | 6/2005 | Baker et al. |
| 6,914,197 B2 | 7/2005 | Doherty et al. |
| 6,950,950 B2 | 9/2005 | Sawyers et al. |
| 6,962,454 B1 | 11/2005 | Costello |
| 6,970,957 B1 | 11/2005 | Oshins et al. |
| 6,976,799 B2 | 12/2005 | Kim et al. |
| 6,979,799 B2 | 12/2005 | Kim et al. |
| 7,007,238 B2 | 2/2006 | Glaser |
| 7,025,908 B1 | 4/2006 | Hayashi et al. |
| 7,051,149 B2 | 5/2006 | Wang et al. |
| 7,058,252 B2 | 6/2006 | Woodgate et al. |
| 7,066,634 B2 | 6/2006 | Kitamura et al. |
| 7,091,436 B2 | 8/2006 | Serban |
| 7,099,149 B2 | 8/2006 | Krieger et al. |
| 7,101,048 B2 | 9/2006 | Travis |
| 7,106,222 B2 | 9/2006 | Ward et al. |
| 7,119,965 B1 | 10/2006 | Rolland et al. |
| 7,123,292 B1 | 10/2006 | Seeger et al. |
| 7,152,985 B2 | 12/2006 | Benitez et al. |
| D535,292 S | 1/2007 | Shi et al. |
| 7,194,662 B2 | 3/2007 | Do et al. |

(56) References Cited

U.S. PATENT DOCUMENTS

| | | |
|---|---|---|
| 7,199,931 B2 | 4/2007 | Boettiger et al. |
| 7,213,323 B2 | 5/2007 | Baker et al. |
| 7,213,991 B2 | 5/2007 | Chapman et al. |
| 7,218,830 B2 | 5/2007 | Iimura |
| 7,252,512 B2 | 8/2007 | Tai et al. |
| 7,260,221 B1 | 8/2007 | Atsmon |
| 7,277,087 B2 | 10/2007 | Hill et al. |
| 7,301,759 B2 | 11/2007 | Hsiung |
| 7,365,967 B2 | 4/2008 | Zheng |
| 7,400,805 B2 | 7/2008 | Abu-Ageel |
| 7,447,934 B2 | 11/2008 | Dasari et al. |
| 7,457,108 B2 | 11/2008 | Ghosh |
| 7,469,386 B2 | 12/2008 | Bear et al. |
| 7,481,566 B2 | 1/2009 | Han |
| 7,486,165 B2 | 2/2009 | Ligtenberg et al. |
| 7,499,037 B2 | 3/2009 | Lube |
| 7,499,216 B2 | 3/2009 | Niv et al. |
| 7,502,803 B2 | 3/2009 | Culter et al. |
| 7,515,143 B2 | 4/2009 | Keam et al. |
| 7,542,052 B2 | 6/2009 | Solomon et al. |
| 7,558,594 B2 | 7/2009 | Wilson |
| 7,559,834 B1 | 7/2009 | York |
| 7,561,131 B2 | 7/2009 | Ijzerman et al. |
| RE40,891 E | 9/2009 | Yasutake |
| 7,636,921 B2 | 12/2009 | Louie |
| 7,639,329 B2 | 12/2009 | Takeda et al. |
| 7,643,213 B2 | 1/2010 | Boettiger et al. |
| 7,656,392 B2 | 2/2010 | Bolender |
| 7,729,493 B2 | 6/2010 | Krieger et al. |
| 7,731,147 B2 | 6/2010 | Rha |
| 7,733,326 B1 | 6/2010 | Adiseshan |
| 7,761,119 B2 | 7/2010 | Patel |
| 7,777,972 B1 | 8/2010 | Chen et al. |
| 7,782,342 B2 | 8/2010 | Koh |
| 7,800,708 B2 | 9/2010 | Brott et al. |
| 7,813,715 B2 | 10/2010 | McKillop et al. |
| 7,822,338 B2 | 10/2010 | Wernersson |
| 7,855,716 B2 | 12/2010 | McCreary et al. |
| 7,865,639 B2 | 1/2011 | McCoy et al. |
| 7,884,807 B2 | 2/2011 | Hovden et al. |
| 7,893,921 B2 | 2/2011 | Sato |
| D636,397 S | 4/2011 | Green |
| 7,918,559 B2 | 4/2011 | Tesar |
| 7,928,964 B2 | 4/2011 | Kolmykov-Zotov et al. |
| 7,932,890 B2 | 4/2011 | Onikiri et al. |
| 7,944,520 B2 | 5/2011 | Ichioka et al. |
| 7,945,717 B2 | 5/2011 | Rivalsi |
| 7,967,462 B2 | 6/2011 | Ogiro et al. |
| 7,973,771 B2 | 7/2011 | Geaghan |
| 7,978,281 B2 | 7/2011 | Vergith et al. |
| 8,016,255 B2 | 9/2011 | Lin |
| 8,035,614 B2 | 10/2011 | Bell et al. |
| 8,035,624 B2 | 10/2011 | Bell et al. |
| 8,053,688 B2 | 11/2011 | Conzola et al. |
| 8,059,384 B2 | 11/2011 | Park et al. |
| 8,065,624 B2 | 11/2011 | Morin et al. |
| 8,069,356 B2 | 11/2011 | Rathi et al. |
| RE42,992 E | 12/2011 | David |
| 8,090,885 B2 | 1/2012 | Callaghan et al. |
| 8,098,233 B2 | 1/2012 | Hotelling et al. |
| 8,102,362 B2 | 1/2012 | Ricks et al. |
| 8,115,499 B2 | 2/2012 | Osoinach et al. |
| 8,115,718 B2 | 2/2012 | Chen et al. |
| 8,117,362 B2 | 2/2012 | Rodriguez et al. |
| 8,118,274 B2 | 2/2012 | McClure et al. |
| 8,120,166 B2 | 2/2012 | Koizumi et al. |
| 8,130,203 B2 | 3/2012 | Westerman |
| 8,149,219 B2 | 4/2012 | Lii et al. |
| 8,154,524 B2 | 4/2012 | Wilson et al. |
| 8,162,282 B2 | 4/2012 | Hu et al. |
| D659,139 S | 5/2012 | Gengler |
| 8,169,421 B2 | 5/2012 | Wright et al. |
| 8,220,929 B2 | 7/2012 | Miyawaki et al. |
| 8,229,509 B2 | 7/2012 | Paek et al. |
| 8,229,522 B2 | 7/2012 | Kim et al. |
| 8,231,099 B2 | 7/2012 | Chen |
| 8,243,027 B2 | 8/2012 | Hotelling et al. |
| 8,248,791 B2 | 8/2012 | Wang et al. |
| 8,249,263 B2 | 8/2012 | Cragun |
| 8,255,708 B1 | 8/2012 | Zhang |
| 8,264,310 B2 | 9/2012 | Lauder et al. |
| 8,267,368 B2 | 9/2012 | Torii et al. |
| 8,269,731 B2 | 9/2012 | Molne |
| 8,274,784 B2 | 9/2012 | Franz et al. |
| 8,279,589 B2 | 10/2012 | Kim |
| 8,310,768 B2 | 11/2012 | Lin et al. |
| 8,322,290 B1 | 12/2012 | Mignano |
| 8,345,920 B2 | 1/2013 | Ferren et al. |
| 8,346,206 B1 | 1/2013 | Andrus et al. |
| 8,373,664 B2 | 2/2013 | Wright |
| 8,387,078 B2 | 2/2013 | Memmott |
| 8,403,576 B2 | 3/2013 | Merz |
| 8,416,206 B2 | 4/2013 | Carpendale et al. |
| 8,416,559 B2 | 4/2013 | Agata et al. |
| 8,466,902 B2 | 6/2013 | Boer et al. |
| 8,498,100 B1 | 7/2013 | Whitt, III et al. |
| 8,543,227 B1 | 9/2013 | Perek et al. |
| 8,548,608 B2 | 10/2013 | Perek et al. |
| 8,564,944 B2 | 10/2013 | Whitt, III et al. |
| 8,570,725 B2 | 10/2013 | Whitt, III et al. |
| 8,582,206 B2 | 11/2013 | Travis |
| 8,599,542 B1 | 12/2013 | Healey et al. |
| 8,610,015 B2 | 12/2013 | Whitt et al. |
| 8,614,666 B2 | 12/2013 | Whitman et al. |
| 8,646,999 B2 | 2/2014 | Shaw et al. |
| 8,674,941 B2 | 3/2014 | Casparian et al. |
| 8,699,215 B2 | 4/2014 | Whitt, III et al. |
| 8,717,664 B2 | 5/2014 | Wang et al. |
| 8,719,603 B2 | 5/2014 | Belesiu |
| 8,724,302 B2 | 5/2014 | Whitt et al. |
| 8,744,391 B2 | 6/2014 | Tenbrook et al. |
| 8,749,529 B2 | 6/2014 | Powell et al. |
| 8,762,746 B1 | 6/2014 | Lachwani et al. |
| 8,780,540 B2 | 7/2014 | Whitt, III et al. |
| 8,780,541 B2 | 7/2014 | Whitt et al. |
| 8,791,382 B2 | 7/2014 | Whitt, III et al. |
| 8,825,187 B1 | 9/2014 | Hamrick et al. |
| 8,830,668 B2 | 9/2014 | Whit, III et al. |
| 8,850,241 B2 | 9/2014 | Oler et al. |
| 8,854,799 B2 | 10/2014 | Whitt, III et al. |
| 8,873,227 B2 | 10/2014 | Whitt et al. |
| 8,896,993 B2 | 11/2014 | Belesiu et al. |
| 8,903,517 B2 | 12/2014 | Perek et al. |
| 8,935,774 B2 | 1/2015 | Belesiu et al. |
| 8,947,864 B2 | 2/2015 | Whitt, III et al. |
| 8,949,477 B2 | 2/2015 | Drasnin |
| 9,019,615 B2 | 4/2015 | Travis |
| 9,052,414 B2 | 6/2015 | Travis et al. |
| 9,152,173 B2 | 10/2015 | Lee et al. |
| 9,355,345 B2 | 5/2016 | Powell |
| 9,513,748 B2 | 12/2016 | Rihn et al. |
| 9,638,835 B2 | 5/2017 | Chen |
| 2001/0023818 A1 | 9/2001 | Masaru et al. |
| 2002/0005108 A1 | 1/2002 | Ludwig |
| 2002/0044216 A1 | 4/2002 | Cha |
| 2002/0134828 A1 | 9/2002 | Sandbach et al. |
| 2002/0135457 A1 | 9/2002 | Sandbach et al. |
| 2003/0007648 A1 | 1/2003 | Currell |
| 2003/0011576 A1 | 1/2003 | Sandbach et al. |
| 2003/0051983 A1 | 3/2003 | Lahr |
| 2003/0067450 A1 | 4/2003 | Thursfield et al. |
| 2003/0108720 A1 | 6/2003 | Kashino |
| 2003/0163611 A1 | 8/2003 | Nagao |
| 2003/0165017 A1 | 9/2003 | Amitai |
| 2003/0197687 A1 | 10/2003 | Shetter |
| 2003/0231243 A1 | 12/2003 | Shibutani |
| 2004/0005184 A1 | 1/2004 | Kim et al. |
| 2004/0052506 A1 | 3/2004 | Togino |
| 2004/0056843 A1 | 3/2004 | Lin et al. |
| 2004/0113956 A1 | 6/2004 | Bellwood et al. |
| 2004/0156168 A1 | 8/2004 | LeVasseur et al. |
| 2004/0160734 A1 | 8/2004 | Yim |
| 2004/0169641 A1 | 9/2004 | Bean et al. |
| 2004/0174709 A1 | 9/2004 | Buelow, II et al. |

(56) References Cited

U.S. PATENT DOCUMENTS

| | | |
|---|---|---|
| 2004/0212598 A1 | 10/2004 | Kraus et al. |
| 2004/0212601 A1 | 10/2004 | Cake et al. |
| 2004/0258924 A1 | 12/2004 | Berger et al. |
| 2004/0268000 A1 | 12/2004 | Barker et al. |
| 2005/0001957 A1 | 1/2005 | Amimori et al. |
| 2005/0002073 A1 | 1/2005 | Nakamura et al. |
| 2005/0030728 A1 | 2/2005 | Kawashima et al. |
| 2005/0052831 A1 | 3/2005 | Chen |
| 2005/0055498 A1 | 3/2005 | Beckert et al. |
| 2005/0057515 A1 | 3/2005 | Bathiche |
| 2005/0059489 A1 | 3/2005 | Kim |
| 2005/0062715 A1 | 3/2005 | Tsuji et al. |
| 2005/0073756 A1 | 4/2005 | Poulsen |
| 2005/0084212 A1 | 4/2005 | Fein |
| 2005/0099400 A1 | 5/2005 | Lee |
| 2005/0100690 A1 | 5/2005 | Mayer et al. |
| 2005/0134717 A1 | 6/2005 | Misawa |
| 2005/0146512 A1 | 7/2005 | Hill et al. |
| 2005/0236848 A1 | 10/2005 | Kim et al. |
| 2005/0264653 A1 | 12/2005 | Starkweather et al. |
| 2005/0264988 A1 | 12/2005 | Nicolosi |
| 2005/0283731 A1 | 12/2005 | Saint-Hilaire et al. |
| 2006/0002101 A1 | 1/2006 | Wheatley et al. |
| 2006/0028400 A1 | 2/2006 | Lapstun et al. |
| 2006/0049920 A1 | 3/2006 | Sadler et al. |
| 2006/0085658 A1 | 4/2006 | Allen et al. |
| 2006/0092139 A1 | 5/2006 | Sharma |
| 2006/0096392 A1 | 5/2006 | Inkster et al. |
| 2006/0125799 A1 | 6/2006 | Hillis et al. |
| 2006/0154725 A1 | 7/2006 | Glaser et al. |
| 2006/0155391 A1 | 7/2006 | Pistemaa et al. |
| 2006/0156415 A1 | 7/2006 | Rubinstein et al. |
| 2006/0174143 A1 | 8/2006 | Sawyers et al. |
| 2006/0181514 A1 | 8/2006 | Newman |
| 2006/0187216 A1 | 8/2006 | Trent, Jr. et al. |
| 2006/0192763 A1 | 8/2006 | Ziemkowski |
| 2006/0195522 A1 | 8/2006 | Miyazaki |
| 2006/0227393 A1 | 10/2006 | Herloski |
| 2006/0238550 A1 | 10/2006 | Page |
| 2006/0239006 A1 | 10/2006 | Chaves et al. |
| 2006/0265617 A1 | 11/2006 | Priborsky |
| 2006/0267931 A1 | 11/2006 | Vainio et al. |
| 2006/0272429 A1 | 12/2006 | Ganapathi et al. |
| 2006/0279501 A1 | 12/2006 | Lu et al. |
| 2007/0002587 A1 | 1/2007 | Miyashita |
| 2007/0003267 A1 | 1/2007 | Shibutani |
| 2007/0047260 A1 | 3/2007 | Lee et al. |
| 2007/0056385 A1 | 3/2007 | Lorenz |
| 2007/0062089 A1 | 3/2007 | Homer et al. |
| 2007/0069153 A1 | 3/2007 | Pai-Paranjape et al. |
| 2007/0072474 A1 | 3/2007 | Beasley et al. |
| 2007/0117600 A1 | 5/2007 | Robertson et al. |
| 2007/0121956 A1 | 5/2007 | Bai et al. |
| 2007/0126994 A1 | 6/2007 | Hwang |
| 2007/0145945 A1 | 6/2007 | McGinley et al. |
| 2007/0153545 A1 | 7/2007 | Lee |
| 2007/0172229 A1 | 7/2007 | Wernersson |
| 2007/0176902 A1 | 8/2007 | Newman et al. |
| 2007/0178891 A1 | 8/2007 | Louch et al. |
| 2007/0182663 A1 | 8/2007 | Biech |
| 2007/0182722 A1 | 8/2007 | Hotelling et al. |
| 2007/0185590 A1 | 8/2007 | Reindel et al. |
| 2007/0189667 A1 | 8/2007 | Wakita et al. |
| 2007/0200830 A1 | 8/2007 | Yamamoto |
| 2007/0220708 A1 | 9/2007 | Lewis |
| 2007/0223248 A1 | 9/2007 | Han |
| 2007/0230227 A1 | 10/2007 | Palmer |
| 2007/0234420 A1 | 10/2007 | Novotney et al. |
| 2007/0236408 A1 | 10/2007 | Yamaguchi et al. |
| 2007/0236475 A1 | 10/2007 | Wherry |
| 2007/0236873 A1 | 10/2007 | Yukawa et al. |
| 2007/0247432 A1 | 10/2007 | Oakley |
| 2007/0252674 A1 | 11/2007 | Nelson et al. |
| 2007/0260892 A1 | 11/2007 | Paul et al. |
| 2007/0279744 A1 | 12/2007 | Fujimoto |
| 2007/0283179 A1 | 12/2007 | Burnett et al. |
| 2007/0296709 A1 | 12/2007 | Guanghai |
| 2007/0297625 A1 | 12/2007 | Hjort et al. |
| 2008/0005423 A1 | 1/2008 | Jacobs et al. |
| 2008/0053222 A1 | 3/2008 | Ehrensvard et al. |
| 2008/0059888 A1 | 3/2008 | Dunko |
| 2008/0074398 A1 | 3/2008 | Wright |
| 2008/0080166 A1 | 4/2008 | Duong et al. |
| 2008/0088593 A1 | 4/2008 | Smoot |
| 2008/0094398 A1 | 4/2008 | Ng et al. |
| 2008/0104437 A1 | 5/2008 | Lee |
| 2008/0122803 A1 | 5/2008 | Izadi et al. |
| 2008/0129520 A1 | 6/2008 | Lee |
| 2008/0150913 A1 | 6/2008 | Bell et al. |
| 2008/0151478 A1 | 6/2008 | Chern |
| 2008/0158185 A1 | 7/2008 | Westerman |
| 2008/0174570 A1 | 7/2008 | Jobs et al. |
| 2008/0179507 A2 | 7/2008 | Han |
| 2008/0186660 A1 | 8/2008 | Yang |
| 2008/0225205 A1 | 9/2008 | Travis |
| 2008/0228969 A1 | 9/2008 | Cheah et al. |
| 2008/0238871 A1 | 10/2008 | Tam |
| 2008/0238884 A1 | 10/2008 | Harish |
| 2008/0253822 A1 | 10/2008 | Matias |
| 2008/0307242 A1 | 12/2008 | Qu |
| 2008/0316002 A1 | 12/2008 | Brunet et al. |
| 2008/0316183 A1 | 12/2008 | Westerman et al. |
| 2008/0320190 A1 | 12/2008 | Lydon et al. |
| 2009/0009476 A1 | 1/2009 | Daley, III |
| 2009/0033623 A1 | 2/2009 | Lin |
| 2009/0067156 A1 | 3/2009 | Bonnett et al. |
| 2009/0073957 A1 | 3/2009 | Newland et al. |
| 2009/0083562 A1 | 3/2009 | Park et al. |
| 2009/0089600 A1 | 4/2009 | Nousiainen |
| 2009/0096738 A1 | 4/2009 | Chen et al. |
| 2009/0096756 A1 | 4/2009 | Lube |
| 2009/0102805 A1 | 4/2009 | Meijer et al. |
| 2009/0140985 A1 | 6/2009 | Liu |
| 2009/0142020 A1 | 6/2009 | Van Ostrand et al. |
| 2009/0167718 A1 | 7/2009 | Lee et al. |
| 2009/0174759 A1 | 7/2009 | Yeh et al. |
| 2009/0189873 A1 | 7/2009 | Peterson |
| 2009/0189974 A1 | 7/2009 | Deering |
| 2009/0195497 A1 | 8/2009 | Fitzgerald et al. |
| 2009/0195518 A1 | 8/2009 | Mattice et al. |
| 2009/0200384 A1 | 8/2009 | Masalkar |
| 2009/0207144 A1 | 8/2009 | Bridger |
| 2009/0231275 A1 | 9/2009 | Odgers |
| 2009/0239586 A1 | 9/2009 | Boeve et al. |
| 2009/0244832 A1 | 10/2009 | Behar et al. |
| 2009/0251008 A1 | 10/2009 | Sugaya |
| 2009/0259865 A1 | 10/2009 | Sheynblat et al. |
| 2009/0262492 A1 | 10/2009 | Whitchurch et al. |
| 2009/0265670 A1 | 10/2009 | Kim et al. |
| 2009/0285491 A1 | 11/2009 | Ravenscroft et al. |
| 2009/0296331 A1 | 12/2009 | Choy |
| 2009/0303204 A1 | 12/2009 | Nasiri et al. |
| 2009/0315830 A1 | 12/2009 | Westerman |
| 2009/0320244 A1 | 12/2009 | Lin |
| 2009/0321490 A1 | 12/2009 | Groene et al. |
| 2010/0001963 A1 | 1/2010 | Doray et al. |
| 2010/0013319 A1 | 1/2010 | Kamiyama et al. |
| 2010/0023869 A1 | 1/2010 | Saint-Hilaire et al. |
| 2010/0026656 A1 | 2/2010 | Hotelling et al. |
| 2010/0038821 A1 | 2/2010 | Jenkins et al. |
| 2010/0039081 A1 | 2/2010 | Sip |
| 2010/0039764 A1 | 2/2010 | Locker et al. |
| 2010/0045633 A1 | 2/2010 | Gettemy et al. |
| 2010/0051432 A1 | 3/2010 | Lin et al. |
| 2010/0052880 A1 | 3/2010 | Laitinen et al. |
| 2010/0053534 A1 | 3/2010 | Hsieh et al. |
| 2010/0053771 A1 | 3/2010 | Travis et al. |
| 2010/0054435 A1 | 3/2010 | Louch et al. |
| 2010/0056130 A1 | 3/2010 | Louch et al. |
| 2010/0072351 A1 | 3/2010 | Mahowald |
| 2010/0073329 A1 | 3/2010 | Raman et al. |
| 2010/0077237 A1 | 3/2010 | Sawyers |
| 2010/0079379 A1 | 4/2010 | Demuynck et al. |
| 2010/0085321 A1 | 4/2010 | Pundsack |

(56) References Cited

U.S. PATENT DOCUMENTS

| | | |
|---|---|---|
| 2010/0102182 A1 | 4/2010 | Lin |
| 2010/0102206 A1 | 4/2010 | Cazaux et al. |
| 2010/0103112 A1 | 4/2010 | Yoo et al. |
| 2010/0105443 A1 | 4/2010 | Vaisanen |
| 2010/0106983 A1 | 4/2010 | Kasprzak et al. |
| 2010/0123686 A1 | 5/2010 | Klinghult et al. |
| 2010/0133398 A1 | 6/2010 | Chiu et al. |
| 2010/0142130 A1 | 6/2010 | Wang et al. |
| 2010/0148995 A1 | 6/2010 | Elias |
| 2010/0148999 A1 | 6/2010 | Casparian et al. |
| 2010/0149073 A1 | 6/2010 | Chaum et al. |
| 2010/0149100 A1 | 6/2010 | Meiby |
| 2010/0149104 A1 | 6/2010 | Sim et al. |
| 2010/0149111 A1 | 6/2010 | Olien |
| 2010/0149117 A1 | 6/2010 | Chien et al. |
| 2010/0149377 A1 | 6/2010 | Shintani et al. |
| 2010/0156913 A1 | 6/2010 | Ortega et al. |
| 2010/0161522 A1 | 6/2010 | Tirpak et al. |
| 2010/0164857 A1 | 7/2010 | Liu et al. |
| 2010/0164897 A1 | 7/2010 | Morin et al. |
| 2010/0171891 A1 | 7/2010 | Kaji et al. |
| 2010/0174421 A1 | 7/2010 | Tsai et al. |
| 2010/0177388 A1 | 7/2010 | Cohen et al. |
| 2010/0180063 A1 | 7/2010 | Ananny et al. |
| 2010/0188299 A1 | 7/2010 | Rinehart et al. |
| 2010/0205472 A1 | 8/2010 | Tupman et al. |
| 2010/0206614 A1 | 8/2010 | Park et al. |
| 2010/0214659 A1 | 8/2010 | Levola |
| 2010/0222110 A1 | 9/2010 | Kim et al. |
| 2010/0235546 A1 | 9/2010 | Terlizzi et al. |
| 2010/0238620 A1 | 9/2010 | Fish |
| 2010/0250988 A1 | 9/2010 | Okuda et al. |
| 2010/0259482 A1 | 10/2010 | Ball |
| 2010/0265182 A1 | 10/2010 | Ball et al. |
| 2010/0271771 A1 | 10/2010 | Wu et al. |
| 2010/0274932 A1 | 10/2010 | Kose |
| 2010/0279768 A1 | 11/2010 | Huang et al. |
| 2010/0282953 A1 | 11/2010 | Tam |
| 2010/0284085 A1 | 11/2010 | Laakkonen |
| 2010/0289457 A1 | 11/2010 | Onnerud et al. |
| 2010/0295812 A1 | 11/2010 | Burns et al. |
| 2010/0296163 A1 | 11/2010 | Saarikko |
| 2010/0302378 A1 | 12/2010 | Marks et al. |
| 2010/0302469 A1 | 12/2010 | Yue et al. |
| 2010/0302798 A1 * | 12/2010 | Papakonstantinou ........... G02B 6/0036 362/601 |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0309617 A1 | 12/2010 | Wang et al. |
| 2010/0313680 A1 | 12/2010 | Joung et al. |
| 2010/0315348 A1 | 12/2010 | Jellicoe et al. |
| 2010/0315373 A1 | 12/2010 | Steinhauser et al. |
| 2010/0321877 A1 | 12/2010 | Moser |
| 2010/0324457 A1 | 12/2010 | Bean et al. |
| 2010/0325155 A1 | 12/2010 | Skinner et al. |
| 2011/0002577 A1 | 1/2011 | Van Ostrand |
| 2011/0007047 A1 | 1/2011 | Fujioka et al. |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0032127 A1 | 2/2011 | Roush |
| 2011/0032215 A1 | 2/2011 | Sirotich et al. |
| 2011/0035209 A1 | 2/2011 | Macfarlane |
| 2011/0036965 A1 | 2/2011 | Zhang et al. |
| 2011/0037721 A1 | 2/2011 | Cranfill et al. |
| 2011/0043479 A1 | 2/2011 | van Aerle et al. |
| 2011/0043990 A1 | 2/2011 | Mickey et al. |
| 2011/0044579 A1 | 2/2011 | Travis et al. |
| 2011/0050576 A1 | 3/2011 | Forutanpour et al. |
| 2011/0050626 A1 | 3/2011 | Porter et al. |
| 2011/0055407 A1 | 3/2011 | Lydon et al. |
| 2011/0057724 A1 | 3/2011 | Pabon |
| 2011/0060926 A1 | 3/2011 | Brooks et al. |
| 2011/0069148 A1 | 3/2011 | Jones et al. |
| 2011/0072391 A1 | 3/2011 | Hanggie et al. |
| 2011/0074688 A1 | 3/2011 | Hull et al. |
| 2011/0096035 A1 | 4/2011 | Shen |
| 2011/0102326 A1 | 5/2011 | Casparian et al. |
| 2011/0107958 A1 | 5/2011 | Pance et al. |
| 2011/0113368 A1 | 5/2011 | Carvajal et al. |
| 2011/0115738 A1 | 5/2011 | Suzuki et al. |
| 2011/0117970 A1 | 5/2011 | Choi |
| 2011/0122071 A1 | 5/2011 | Powell |
| 2011/0134032 A1 | 6/2011 | Chiu et al. |
| 2011/0157046 A1 | 6/2011 | Lee et al. |
| 2011/0157087 A1 | 6/2011 | Kanehira et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0169762 A1 | 7/2011 | Weiss |
| 2011/0169778 A1 | 7/2011 | Nungester et al. |
| 2011/0170289 A1 | 7/2011 | Allen et al. |
| 2011/0176035 A1 | 7/2011 | Poulsen |
| 2011/0179864 A1 | 7/2011 | Raasch et al. |
| 2011/0184646 A1 | 7/2011 | Wong et al. |
| 2011/0184824 A1 | 7/2011 | George et al. |
| 2011/0188199 A1 | 8/2011 | Pan |
| 2011/0193787 A1 | 8/2011 | Morishige et al. |
| 2011/0197156 A1 | 8/2011 | Strait et al. |
| 2011/0205372 A1 | 8/2011 | Miramontes |
| 2011/0216039 A1 | 9/2011 | Chen et al. |
| 2011/0221678 A1 | 9/2011 | Davydov |
| 2011/0227913 A1 | 9/2011 | Hyndman |
| 2011/0231682 A1 | 9/2011 | Kakish et al. |
| 2011/0234535 A1 | 9/2011 | Hung et al. |
| 2011/0235179 A1 | 9/2011 | Simmonds |
| 2011/0242440 A1 | 10/2011 | Noma et al. |
| 2011/0242670 A1 | 10/2011 | Simmonds |
| 2011/0248152 A1 | 10/2011 | Svajda et al. |
| 2011/0248920 A1 | 10/2011 | Larsen |
| 2011/0248941 A1 | 10/2011 | Abdo et al. |
| 2011/0261001 A1 | 10/2011 | Liu |
| 2011/0266672 A1 | 11/2011 | Sylvester |
| 2011/0267272 A1 | 11/2011 | Meyer et al. |
| 2011/0273475 A1 | 11/2011 | Herz et al. |
| 2011/0290686 A1 | 12/2011 | Huang |
| 2011/0291993 A1 | 12/2011 | Miyazaki |
| 2011/0295697 A1 | 12/2011 | Boston et al. |
| 2011/0297566 A1 | 12/2011 | Gallagher et al. |
| 2011/0298919 A1 | 12/2011 | Maglaque |
| 2011/0302518 A1 | 12/2011 | Zhang |
| 2011/0304577 A1 | 12/2011 | Brown |
| 2011/0304815 A1 | 12/2011 | Newell |
| 2011/0305875 A1 | 12/2011 | Sanford et al. |
| 2011/0316807 A1 | 12/2011 | Corrion |
| 2011/0317399 A1 | 12/2011 | Hsu |
| 2011/0320204 A1 | 12/2011 | Locker et al. |
| 2012/0002820 A1 | 1/2012 | Leichter |
| 2012/0007821 A1 | 1/2012 | Zaliva |
| 2012/0020490 A1 | 1/2012 | Leichter |
| 2012/0023401 A1 | 1/2012 | Arscott et al. |
| 2012/0023459 A1 | 1/2012 | Westerman |
| 2012/0024682 A1 | 2/2012 | Huang et al. |
| 2012/0026096 A1 | 2/2012 | Ku |
| 2012/0032887 A1 | 2/2012 | Chiu et al. |
| 2012/0032891 A1 | 2/2012 | Parivar |
| 2012/0038495 A1 | 2/2012 | Ishikawa |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0062850 A1 | 3/2012 | Travis |
| 2012/0068919 A1 | 3/2012 | Lauder et al. |
| 2012/0069540 A1 | 3/2012 | Lauder et al. |
| 2012/0075249 A1 | 3/2012 | Hoch |
| 2012/0075256 A1 | 3/2012 | Izadi et al. |
| 2012/0077384 A1 | 3/2012 | Bar-Niv et al. |
| 2012/0092279 A1 | 4/2012 | Martin |
| 2012/0094257 A1 | 4/2012 | Pillischer et al. |
| 2012/0098872 A1 | 4/2012 | Kim et al. |
| 2012/0099749 A1 | 4/2012 | Rubin et al. |

(56) References Cited

U.S. PATENT DOCUMENTS

| | | |
|---|---|---|
| 2012/0102436 A1 | 4/2012 | Nurmi |
| 2012/0102438 A1 | 4/2012 | Robinson et al. |
| 2012/0113031 A1 | 5/2012 | Lee et al. |
| 2012/0113223 A1 | 5/2012 | Hilliges et al. |
| 2012/0113579 A1 | 5/2012 | Agata et al. |
| 2012/0117409 A1 | 5/2012 | Lee et al. |
| 2012/0127118 A1 | 5/2012 | Nolting et al. |
| 2012/0133678 A1* | 5/2012 | Kim ................ G06F 3/0488 345/649 |
| 2012/0139727 A1 | 6/2012 | Houvener et al. |
| 2012/0140396 A1 | 6/2012 | Zeliff et al. |
| 2012/0145525 A1 | 6/2012 | Ishikawa |
| 2012/0146943 A1 | 6/2012 | Fairley et al. |
| 2012/0162088 A1 | 6/2012 | van Lieshout et al. |
| 2012/0162126 A1 | 6/2012 | Yuan et al. |
| 2012/0162693 A1 | 6/2012 | Ito |
| 2012/0170284 A1 | 7/2012 | Shedletsky |
| 2012/0175487 A1 | 7/2012 | Goto |
| 2012/0182242 A1 | 7/2012 | Lindahl et al. |
| 2012/0182249 A1 | 7/2012 | Endo et al. |
| 2012/0182743 A1 | 7/2012 | Chou |
| 2012/0188243 A1 | 7/2012 | Fujii et al. |
| 2012/0194448 A1 | 8/2012 | Rothkopf |
| 2012/0195063 A1 | 8/2012 | Kim et al. |
| 2012/0200532 A1 | 8/2012 | Powell et al. |
| 2012/0212438 A1 | 8/2012 | Vaisanen |
| 2012/0218194 A1 | 8/2012 | Silverman |
| 2012/0224073 A1 | 9/2012 | Miyahara |
| 2012/0229634 A1 | 9/2012 | Laett et al. |
| 2012/0242584 A1 | 9/2012 | Tuli |
| 2012/0243102 A1* | 9/2012 | Takeda ................ G02B 17/086 359/630 |
| 2012/0243204 A1 | 9/2012 | Robinson |
| 2012/0246377 A1 | 9/2012 | Bhesania |
| 2012/0249443 A1 | 10/2012 | Anderson et al. |
| 2012/0250873 A1 | 10/2012 | Bakalos et al. |
| 2012/0256959 A1 | 10/2012 | Ye et al. |
| 2012/0260177 A1 | 10/2012 | Sehrer |
| 2012/0268912 A1 | 10/2012 | Minami et al. |
| 2012/0274811 A1 | 11/2012 | Bakin |
| 2012/0299872 A1 | 11/2012 | Nishikawa et al. |
| 2012/0300275 A1 | 11/2012 | Vilardell et al. |
| 2012/0312955 A1 | 12/2012 | Randolph |
| 2013/0009413 A1 | 1/2013 | Chiu et al. |
| 2013/0027354 A1 | 1/2013 | Yabuta et al. |
| 2013/0027867 A1 | 1/2013 | Lauder et al. |
| 2013/0044074 A1 | 2/2013 | Park et al. |
| 2013/0063873 A1 | 3/2013 | Wodrich et al. |
| 2013/0067126 A1 | 3/2013 | Casparian et al. |
| 2013/0073877 A1 | 3/2013 | Radke |
| 2013/0076617 A1 | 3/2013 | Csaszar et al. |
| 2013/0082824 A1 | 4/2013 | Colley |
| 2013/0088431 A1 | 4/2013 | Ballagas et al. |
| 2013/0106766 A1 | 5/2013 | Yilmaz et al. |
| 2013/0106813 A1 | 5/2013 | Hotelling et al. |
| 2013/0107572 A1 | 5/2013 | Holman et al. |
| 2013/0120760 A1 | 5/2013 | Raguin et al. |
| 2013/0135214 A1 | 5/2013 | Li et al. |
| 2013/0162554 A1 | 6/2013 | Lauder et al. |
| 2013/0172906 A1 | 7/2013 | Olson et al. |
| 2013/0181926 A1 | 7/2013 | Lim |
| 2013/0191741 A1 | 7/2013 | Dickinson et al. |
| 2013/0201094 A1 | 8/2013 | Travis |
| 2013/0207896 A1 | 8/2013 | Robinson et al. |
| 2013/0217451 A1 | 8/2013 | Komiyama et al. |
| 2013/0222353 A1 | 8/2013 | Large |
| 2013/0227836 A1 | 9/2013 | Whitt, III |
| 2013/0228023 A1 | 9/2013 | Drasnin |
| 2013/0228433 A1 | 9/2013 | Shaw |
| 2013/0228434 A1 | 9/2013 | Whitt, III |
| 2013/0228439 A1 | 9/2013 | Whitt, III |
| 2013/0229100 A1 | 9/2013 | Siddiqui et al. |
| 2013/0229335 A1 | 9/2013 | Whitman |
| 2013/0229347 A1 | 9/2013 | Lutz, III |
| 2013/0229350 A1 | 9/2013 | Shaw et al. |
| 2013/0229351 A1 | 9/2013 | Whitt, III |
| 2013/0229354 A1 | 9/2013 | Whitt, III et al. |
| 2013/0229357 A1 | 9/2013 | Powell |
| 2013/0229363 A1 | 9/2013 | Whitman |
| 2013/0229366 A1 | 9/2013 | Dighde |
| 2013/0229380 A1 | 9/2013 | Lutz, III |
| 2013/0229534 A1 | 9/2013 | Panay |
| 2013/0229568 A1 | 9/2013 | Belesiu et al. |
| 2013/0229570 A1 | 9/2013 | Beck et al. |
| 2013/0229756 A1 | 9/2013 | Whitt, III |
| 2013/0229757 A1 | 9/2013 | Whitt, III et al. |
| 2013/0229758 A1 | 9/2013 | Belesiu |
| 2013/0229759 A1 | 9/2013 | Whitt, III et al. |
| 2013/0229760 A1 | 9/2013 | Whitt, III |
| 2013/0229761 A1 | 9/2013 | Shaw |
| 2013/0229762 A1 | 9/2013 | Whitt, III |
| 2013/0229773 A1 | 9/2013 | Siddiqui et al. |
| 2013/0230346 A1 | 9/2013 | Shaw |
| 2013/0231755 A1 | 9/2013 | Perek |
| 2013/0232280 A1 | 9/2013 | Perek |
| 2013/0232348 A1 | 9/2013 | Oler |
| 2013/0232349 A1 | 9/2013 | Oler et al. |
| 2013/0232350 A1 | 9/2013 | Belesiu et al. |
| 2013/0232353 A1 | 9/2013 | Belesiu |
| 2013/0232571 A1 | 9/2013 | Belesiu |
| 2013/0262886 A1 | 10/2013 | Nishimura |
| 2013/0265220 A1 | 10/2013 | Fleischmann et al. |
| 2013/0300590 A1 | 11/2013 | Dietz |
| 2013/0300647 A1 | 11/2013 | Drasnin |
| 2013/0301014 A1 | 11/2013 | DeJong et al. |
| 2013/0301199 A1 | 11/2013 | Whitt |
| 2013/0301206 A1 | 11/2013 | Whitt |
| 2013/0304941 A1 | 11/2013 | Drasnin |
| 2013/0322000 A1 | 12/2013 | Whitt |
| 2013/0322001 A1 | 12/2013 | Whitt |
| 2013/0329301 A1 | 12/2013 | Travis |
| 2013/0329360 A1 | 12/2013 | Aldana |
| 2013/0332628 A1 | 12/2013 | Panay |
| 2013/0339757 A1 | 12/2013 | Reddy |
| 2014/0012401 A1 | 1/2014 | Perek et al. |
| 2014/0022629 A1 | 1/2014 | Powell |
| 2014/0043275 A1 | 2/2014 | Whitman |
| 2014/0048399 A1 | 2/2014 | Whitt, III |
| 2014/0098085 A1 | 4/2014 | Lee |
| 2014/0119802 A1 | 5/2014 | Shaw |
| 2014/0168131 A1 | 6/2014 | Rihn |
| 2014/0185215 A1 | 7/2014 | Whitt |
| 2014/0185220 A1 | 7/2014 | Whitt |
| 2014/0204514 A1 | 7/2014 | Whitt |
| 2014/0204515 A1 | 7/2014 | Whitt |
| 2014/0233237 A1 | 8/2014 | Lutian |
| 2014/0247546 A1 | 9/2014 | Whitt |
| 2014/0254032 A1 | 9/2014 | Chen |
| 2014/0291134 A1 | 10/2014 | Whitt |
| 2014/0293534 A1 | 10/2014 | Siddiqui |
| 2014/0362506 A1 | 12/2014 | Whitt, III et al. |
| 2014/0379942 A1 | 12/2014 | Perek et al. |
| 2015/0036274 A1 | 2/2015 | Belesiu et al. |

FOREIGN PATENT DOCUMENTS

| | | |
|---|---|---|
| CN | 1352767 | 6/2002 |
| CN | 1440513 | 9/2003 |
| CN | 101140384 | 3/2008 |
| CN | 102047155 | 5/2011 |
| CN | 102147643 | 8/2011 |
| CN | 102483522 | 5/2012 |
| CN | 103455149 | 12/2013 |
| EP | 0271956 | 6/1988 |
| EP | 1223722 | 7/2002 |
| EP | 1480029 | 11/2004 |
| EP | 1591891 | 11/2005 |
| EP | 2026178 | 2/2009 |
| EP | 2353978 | 8/2011 |
| EP | 2381290 | 10/2011 |
| EP | 2400365 | 12/2011 |
| GB | 2123213 | 1/1984 |
| JP | 56108127 | 8/1981 |
| JP | H021802 A | 1/1990 |

(56) References Cited

FOREIGN PATENT DOCUMENTS

| | | |
|---|---|---|
| JP | H03198023 A | 8/1991 |
| JP | H1078357 | 3/1998 |
| JP | 10301055 | 11/1998 |
| JP | 10326124 | 12/1998 |
| JP | 1173239 | 3/1999 |
| JP | 11338575 | 12/1999 |
| JP | 2000010654 | 1/2000 |
| JP | 2000056259 A | 2/2000 |
| JP | 2001142564 | 5/2001 |
| JP | 2001174746 | 6/2001 |
| JP | 2004038950 | 2/2004 |
| JP | 2006163459 | 6/2006 |
| JP | 2006294361 | 10/2006 |
| JP | 2008083599 | 4/2008 |
| JP | 2009003053 | 1/2009 |
| JP | 2009122551 | 6/2009 |
| JP | 2010244514 | 10/2010 |
| JP | 2012042654 | 3/2012 |
| JP | 6253117 B2 | 12/2017 |
| KR | 20010107055 | 12/2001 |
| KR | 20050014299 | 2/2005 |
| KR | 20060003093 | 1/2006 |
| KR | 20080006404 | 1/2008 |
| KR | 20090029411 | 3/2009 |
| KR | 20100022059 | 2/2010 |
| KR | 20100067366 | 6/2010 |
| KR | 20100115675 | 10/2010 |
| KR | 20110064265 | 6/2011 |
| KR | 1020110087178 | 8/2011 |
| KR | 20110109791 | 10/2011 |
| KR | 20110120002 | 11/2011 |
| KR | 20110122333 | 11/2011 |
| KR | 101113530 | 2/2012 |
| WO | WO-1999019995 | 4/1999 |
| WO | WO-1999064784 | 12/1999 |
| WO | WO-2000079327 | 12/2000 |
| WO | WO-2006044818 | 4/2006 |
| WO | WO-2007112172 | 10/2007 |
| WO | WO-2009034484 | 3/2009 |
| WO | WO-2011016200 | 2/2011 |
| WO | WO-2011049609 | 4/2011 |
| WO | WO-2012063410 | 5/2012 |

OTHER PUBLICATIONS

"Final Office Action", U.S. Appl. No. 13/773,496, dated Oct. 29, 2015, 16 pages.
"Non-Final Office Action", U.S. Appl. No. 13/714,401, dated Dec. 3, 2015, 16 pages.
"Non-Final Office Action", U.S. Appl. No. 13/786,233, dated Sep. 29, 2015, 10 pages.
"Foreign Office Action", CN Application No. 201310225788.1, dated Feb. 29, 2016, 11 Pages.
"Foreign Office Action", CN Application No. 201380030964.4, dated Feb. 14, 2016, 11 pages.
"Non-Final Office Action", U.S. Appl. No. 13/492,232, dated Dec. 17, 2015, 11 pages.
"Notice of Allowance", U.S. Appl. No. 13/555,404, dated Feb. 4, 2016, 9 pages.
"Supplemental Notice of Allowance", U.S. Appl. No. 13/555,404, dated Mar. 10, 2016, 2 pages.
"Corrected Notice of Allowance", U.S. Appl. No. 13/555,404, dated May 2, 2016, 2 pages.
"Extended European Search Report", EP Application No. 13861059.7, dated Apr. 29, 2016, 8 pages.
"Final Office Action", U.S. Appl. No. 13/492,232, dated May 25, 2016, 12 pages.
"Final Office Action", U.S. Appl. No. 13/714,401, dated May 12, 2016, 17 pages.
"Final Office Action", U.S. Appl. No. 13/786,233, dated May 5, 2016, 12 pages.
"Non-Final Office Action", U.S. Appl. No. 13/773,496, dated Jun. 29, 2016, 17 pages.
"Final Office Action", U.S. Appl. No. 13/492,232, dated Jul. 10, 2015, 11 pages.
"Final Office Action", U.S. Appl. No. 13/714,401, dated Aug. 4, 2015, 15 pages.
"Foreign Office Action", CN Application No. 201310225788.1, dated Jun. 23, 2015, 14 Pages.
"Non-Final Office Action", U.S. Appl. No. 13/555,404, dated Aug. 17, 2015, 10 pages.
"Non-Final Office Action", U.S. Appl. No. 13/773,496, dated Jun. 8, 2015, 16 pages.
"Supplemental Notice of Allowance", U.S. Appl. No. 13/647,507, dated Jun. 30, 2015, 2 pages.
"Supplemental Notice of Allowance", U.S. Appl. No. 13/647,507, dated Jul. 16, 2015, 2 pages.
"Supplemental Notice of Allowance", U.S. Appl. No. 13/647,507, dated Aug. 27, 2015, 2 pages.
"Foreign Office Action", CN Application No. 201310225788.1, dated Sep. 1, 2016, 8 pages.
"Foreign Office Action", CN Application No. 201380030964.4, dated Sep. 1, 2016, 11 pages.
"Notice of Allowance", U.S. Appl. No. 13/714,401, dated Aug. 22, 2016, 8 pages.
"Accessing Device Sensors", retrieved from <https://developer.palm.com/content/api/dev-guide/pdk/accessing-device-sensors.html> on May 25, 2012, 2011, 4 pages.
"ACPI Docking for Windows Operating Systems", Retrieved from: <http://www.scritube.com/limba/engleza/software/ACPI-Docking-for-Windows-Opera331824193.php> on Jul. 6, 2012, 2012, 10 pages.
"Advanced Configuration and Power Management Specification", Intel Corporation, Microsoft Corporation, Toshiba Corp. Revision 1, Dec. 22, 1996, 364 pages.
"Advisory Action", U.S. Appl. No. 13/408,257, dated Apr. 8, 2015, 9 pages.
"Advisory Action", U.S. Appl. No. 13/939,032, dated Feb. 24, 2014, 2 pages.
"Advisory Action", U.S. Appl. No. 14/199,924, dated May 28, 2014, 2 pages.
"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, Jan. 2013, 1 page.
"Corrected Notice of Allowance", U.S. Appl. No. 13/470,633, dated Apr. 9, 2013, 2 pages.
"Corrected Notice of Allowance", U.S. Appl. No. 13/470,633, dated Jul. 2, 2013, 2 pages.
"Corrected Notice of Allowance", U.S. Appl. No. 13/471,030, dated Sep. 30, 2014, 2 pages.
"Corrected Notice of Allowance", U.S. Appl. No. 13/563,435, dated Jan. 14, 2014, 2 pages.
"Corrected Notice of Allowance", U.S. Appl. No. 13/563,435, dated Mar. 20, 2014, 2 pages.
"Corrected Notice of Allowance", U.S. Appl. No. 13/563,435, dated Jan. 22, 2014, 2 pages.
"Corrected Notice of Allowance", U.S. Appl. No. 13/565,124, dated Apr. 3, 2014, 4 pages.
"Corrected Notice of Allowance", U.S. Appl. No. 13/565,124, dated Mar. 10, 2014, 2 pages.
"Corrected Notice of Allowance", U.S. Appl. No. 13/565,124, dated Apr. 14, 2014, 2 pages.
"Corrected Notice of Allowance", U.S. Appl. No. 13/651,232, dated Jul. 31, 2014, 2 pages.
"Corrected Notice of Allowance", U.S. Appl. No. 13/651,287, dated Aug. 21, 2014, 2 pages.
"Corrected Notice of Allowance", U.S. Appl. No. 13/651,327, dated Sep. 12, 2013, 2 pages.
"Corrected Notice of Allowance", U.S. Appl. No. 13/651,327, dated Sep. 23, 2013, 2 pages.
"Corrected Notice of Allowance", U.S. Appl. No. 13/651,726, dated Sep. 17, 2013, 2 pages.

(56) References Cited

OTHER PUBLICATIONS

"Corrected Notice of Allowance", U.S. Appl. No. 13/938,930, dated May 6, 2014, 2 pages.
"Corrected Notice of Allowance", U.S. Appl. No. 13/938,930, dated Jun. 6, 2014, 2 pages.
"Corrected Notice of Allowance", U.S. Appl. No. 13/939,002, dated May 22, 2014, 2 pages.
"Corrected Notice of Allowance", U.S. Appl. No. 13/939,002, dated Jun. 19, 2014, 2 pages.
"Corrected Notice of Allowance", U.S. Appl. No. 13/939,002, dated May 5, 2014, 2 pages.
"Corrected Notice of Allowance", U.S. Appl. No. 13/939,032, dated Jun. 26, 2014, 2 pages.
"Corrected Notice of Allowance", U.S. Appl. No. 13/939,032, dated Jul. 15, 2014, 2 pages.
"Corrected Notice of Allowance", U.S. Appl. No. 14/199,924, dated Aug. 29, 2014, 2 pages.
"Corrected Notice of Allowance", U.S. Appl. No. 14/199,924, dated Sep. 5, 2014, 2 pages.
"Corrected Notice of Allowance", U.S. Appl. No. 14/199,924, dated Sep. 19, 2014, 2 pages.
"Corrected Notice of Allowance", U.S. Appl. No. 14/277,240, dated Jan. 8, 2015, 2 pages.
"Final Office Action", U.S. Appl. No. 13/408,257, dated Mar. 28, 2014, 17 pages.
"Final Office Action", U.S. Appl. No. 13/408,257, dated Dec. 10, 2014, 15 pages.
"Final Office Action", U.S. Appl. No. 13/468,882, dated Feb. 12, 2015, 9 pages.
"Final Office Action", U.S. Appl. No. 13/468,949, dated Oct. 6, 2014, 11 pages.
"Final Office Action", U.S. Appl. No. 13/470,951, dated Jan. 12, 2015, 20 pages.
"Final Office Action", U.S. Appl. No. 13/471,001, dated Jul. 25, 2013, 20 pages.
"Final Office Action", U.S. Appl. No. 13/471,054, dated Oct. 23, 2014, 17 pages.
"Final Office Action", U.S. Appl. No. 13/471,139, dated Sep. 16, 2013, 13 pages.
"Final Office Action", U.S. Appl. No. 13/471,336, dated Aug. 28, 2013, 18 pages.
"Final Office Action", U.S. Appl. No. 13/471,336, dated Oct. 6, 2014, 13 pages.
"Final Office Action", U.S. Appl. No. 13/471,376, dated Aug. 18, 2014, 24 pages.
"Final Office Action", U.S. Appl. No. 13/471,412, dated Dec. 15, 2014, 11 pages.
"Final Office Action", U.S. Appl. No. 13/492,232, dated Nov. 17, 2014, 13 pages.
"Final Office Action", U.S. Appl. No. 13/527,263, dated Jan. 27, 2015, 7 pages.
"Final Office Action", U.S. Appl. No. 13/564,520, dated Jan. 15, 2014, 7 pages.
"Final Office Action", U.S. Appl. No. 13/595,700, dated Aug. 15, 2014, 6 pages.
"Final Office Action", U.S. Appl. No. 13/595,700, dated Oct. 9, 2014, 8 pages.
"Final Office Action", U.S. Appl. No. 13/599,635, dated Aug. 8, 2014, 16 pages.
"Final Office Action", U.S. Appl. No. 13/647,507, dated Oct. 27, 2014, 33 pages.
"Final Office Action", U.S. Appl. No. 13/651,195, dated Apr. 18, 2013, 13 pages.
"Final Office Action", U.S. Appl. No. 13/651,232, dated May 21, 2013, 21 pages.
"Final Office Action", U.S. Appl. No. 13/651,287, dated May 3, 2013, 16 pages.
"Final Office Action", U.S. Appl. No. 13/651,976, dated Jul. 25, 2013, 21 pages.
"Final Office Action", U.S. Appl. No. 13/653,321, dated Aug. 2, 2013, 17 pages.
"Final Office Action", U.S. Appl. No. 13/653,682, dated Jun. 11, 2014, 11 pages.
"Final Office Action", U.S. Appl. No. 13/653,682, dated Oct. 18, 2013, 16 pages.
"Final Office Action", U.S. Appl. No. 13/656,055, dated Sep. 17, 2014, 10 pages.
"Final Office Action", U.S. Appl. No. 13/656,055, dated Oct. 23, 2013, 14 pages.
"Final Office Action", U.S. Appl. No. 13/714,401, dated Nov. 25, 2014, 15 pages.
"Final Office Action", U.S. Appl. No. 13/773,496, dated Nov. 4, 2014, 11 pages.
"Final Office Action", U.S. Appl. No. 13/780,228, dated Mar. 28, 2014, 13 pages.
"Final Office Action", U.S. Appl. No. 13/786,233, dated May 27, 2015, 14 pages.
"Final Office Action", U.S. Appl. No. 13/938,930, dated Nov. 8, 2013, 10 pages.
"Final Office Action", U.S. Appl. No. 13/939,002, dated Nov. 8, 2013, 7 pages.
"Final Office Action", U.S. Appl. No. 13/939,032, dated Dec. 20, 2013, 5 pages.
"Final Office Action", U.S. Appl. No. 14/063,912, dated Jan. 12, 2015, 12 pages.
"Final Office Action", U.S. Appl. No. 14/063,912, dated Apr. 29, 2014, 10 pages.
"Final Office Action", U.S. Appl. No. 14/199,924, dated May 6, 2014, 5 pages.
"Final Office Action", U.S. Appl. No. 14/200,595, dated Nov. 19, 2014, 5 pages.
"Final Office Action", U.S. Appl. No. 14/225,276, dated Dec. 17, 2014, 6 pages.
"FingerWorks Installation and Operation Guide for the TouchStream ST and TouchStream LP", FingerWorks, Inc. Retrieved from <http://ec1.images-amazon.com/media/i3d/01/A/man-migrate/MANUAL000049862.pdf>, 2002, 14 pages.
"First Examination Report", NZ Application No. 628690, dated Nov. 27, 2014, 2 pages.
"First One Handed Fabric Keyboard with Bluetooth Wireless Technology", Retrieved from: <http://press.xtvworld.com/article3817.html> on May 8, 2012, Jan. 6, 2005, 2 pages.
"For Any Kind of Proceeding 2011 Springtime as Well as Coil Nailers as Well as Hotter Summer Season", Lady Shoe Worlds, retrieved from <http://www.ladyshoesworld.com/2011/09/18/for-any-kind-of-proceeding-2011-springtime-as-well-as-coil-nailers-as-well-as-hotter-summer-season/> on Nov. 3, 2011, Sep. 8, 2011, 2 pages.
"Force and Position Sensing Resistors: An Emerging Technology", Interlink Electronics, Available at <http://staff.science.uva.nl/~vlaander/docu/FSR/An_Exploring_Technology.pdf>, Feb. 1990, pp. 1-6.
"Foreign Notice of Allowance", CN Application No. 201320096755.7, dated Jan. 27, 2014, 2 pages.
"Foreign Notice of Allowance", CN Application No. 201320097065.3, dated Nov. 21, 2013, 2 pages.
"Foreign Office Action", CN Application No. 201110272868.3, dated Apr. 1, 2013, 10 pages.
"Foreign Office Action", CN Application No. 201320097065.3, dated Jun. 18, 2013, 2 pages.
"Foreign Office Action", CN Application No. 201320097066.8, dated Oct. 24, 2013, 5 Pages.
"Foreign Office Action", CN Application No. 201320097079.5, dated Jul. 28, 2014, 4 pages.
"Foreign Office Action", CN Application No. 201320097079.5, dated Sep. 26, 2013, 4 pages.
"Foreign Office Action", CN Application No. 201320328022.1, dated Feb. 17, 2014, 4 Pages.
"Foreign Office Action", CN Application No. 201320328022.1, dated Oct. 18, 2013, 3 Pages.

(56) References Cited

OTHER PUBLICATIONS

"Frogpad Introduces Weareable Fabric Keyboard with Bluetooth Technology", Retrieved from: <http://www.geekzone.co.nz/content. asp?contentid=3898> on May 7, 2012, Jan. 7, 2005, 3 pages.
"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 2012, 4 pages.
"Interlink Electronics FSR (TM) Force Sensing Resistors (TM)", Retrieved at <<http://akizukidenshi.com/download/ds/ interlinkelec/94-00004+Rev+B%20FSR%20Integration%20Guide.pdf on Mar. 21, 2013, 36 pages.
"International Search Report and Written Opinion", Application No. PCT/US2013/028479, dated Jun. 17, 2013, 10 pages.
"International Search Report and Written Opinion", Application No. PCT/US2014/031531, dated Jun. 20, 2014, 10 Pages.
"International Search Report and Written Opinion", Application No. PCT/US2013/028483, dated Jun. 24, 2014, 10 pages.
"International Search Report and Written Opinion", Application No. PCT/US2013/028484, dated Jun. 24, 2014, 10 pages.
"International Search Report and Written Opinion", Application No. PCT/US2013/028485, dated Jun. 25, 2014, 10 pages.
"International Search Report and Written Opinion", Application No. PCT/US2013/028769, dated Jun. 26, 2014, 10 pages.
"International Search Report and Written Opinion", Application No. PCT/US2014/043546, dated Oct. 9, 2014, 10 pages.
"International Search Report and Written Opinion", Application No. PCT/US2013/051421, dated Dec. 6, 2013, 10 pages.
"International Search Report and Written Opinion", Application No. PCT/US2014/020050, dated May 9, 2014, 10 pages.
"International Search Report and Written Opinion", Application No. PCT/US2013/028771, dated Jun. 19, 2014, 10 pages.
"International Search Report and Written Opinion", Application No. PCT/US2013/028486, dated Jun. 20, 2014, 10 pages.
"International Search Report and Written Opinion", Application No. PCT/US2013/041017, dated Jul. 17, 2014, 10 pages.
"International Search Report and Written Opinion", Application No. PCT/US2013/028489, dated Jun. 20, 2014, 11 pages.
"International Search Report and Written Opinion", Application No. PCT/US2013/028488, dated Jun. 24, 2014, 11 pages.
"International Search Report and Written Opinion", Application No. PCT/US2013/028767, dated Jun. 24, 2014, 11 pages.
"International Search Report and Written Opinion", Application No. PCT/US2014/016654, dated May 16, 2014, 11 pages.
"International Search Report and Written Opinion", Application No. PCT/US2013/028481, dated Jun. 19, 2014, 11 pages.
"International Search Report and Written Opinion", Application No. PCT/US2013/028948, dated Jun. 21, 2013, 11 pages.
"International Search Report and Written Opinion", Application No. PCT/US2013/029461, dated Jun. 21, 2013, 11 pages.
"International Search Report and Written Opinion", Application No. PCT/US2013/028490, dated Jun. 24, 2014, 11 pages.
"International Search Report and Written Opinion", Application No. PCT/US2013/028766, dated Jun. 26, 2014, 11 pages.
"International Search Report and Written Opinion", Application No. PCT/US2013/028772, dated Jun. 30, 2014, 11 pages.
"International Search Report and Written Opinion", Application No. PCT/US2013/040968, dated Sep. 5, 2013, 11 pages.
"International Search Report and Written Opinion", Application No. PCT/US2013/028768, dated Jun. 24, 2014, 12 pages.
"International Search Report and Written Opinion", Application No. PCT/US2013/075180, dated May 6, 2014, 12 pages.
"International Search Report and Written Opinion", Application No. PCT/US2013/028482, dated Jun. 20, 2014, 13 pages.
"International Search Report and Written Opinion", Application No. PCT/US2013/042550, dated Sep. 24, 2013, 14 pages.
"International Search Report and Written Opinion", Application No. PCT/US2011/050471, dated Apr. 9, 2012, 8 pages.
"International Search Report and Written Opinion", Application No. PCT/US2013/063156, dated Dec. 5, 2013, 9 pages.
"International Search Report and Written Opinion", Application No. PCT/US2013/028487, dated May 27, 2014, 9 pages.
"International Search Report and Written Opinion", Application No. PCT/US2013/028770, dated Jun. 26, 2014, 9 pages.
"International Search Report and Written Opinion", Application No. PCT/US2013/042790, dated Aug. 8, 2013, 9 pages.
"Membrane Keyboards & Membrane Keypads", Retrieved from: <http://www.pannam.com/> on May 9, 2012, Mar. 4, 2009, 2 pages.
"Microsoft Develops Glasses-Free Eye-Tracking 3D Display", Tech-FAQ—retrieved from <http://www.tech-faq.com/microsoft-develops-glasses-free-eye-tracking-3d-display.html> on Nov. 2, 2011, Nov. 2, 2011, 3 pages.
"Microsoft Reveals Futuristic 3D Virtual HoloDesk Patent", Retrieved from <http://www.patentbolt.com/2012/05/microsoft-reveals-futuristic-3d-virtual-holodesk-patent.htmlt> on May 28, 2012, May 23, 2012, 9 pages.
"Motion Sensors", Android Developers—retrieved from <http://developer.android.com/guide/topics/sensors/sensors_motion.html> on May 25, 2012, 2012, 7 pages.
"Non-Final Office Action", U.S. Appl. No. 13/409,967, dated Dec. 10, 2013, 5 pages.
"Non-Final Office Action", U.S. Appl. No. 13/599,635, dated Feb. 25, 2014, 13 pages.
"Non-Final Office Action", U.S. Appl. No. 12/882,994, dated Feb. 1, 2013, 17 pages.
"Non-Final Office Action", U.S. Appl. No. 13/367,812, dated Sep. 18, 2014, 10 pages.
"Non-Final Office Action", U.S. Appl. No. 13/408,257, dated Jul. 2, 2014, 20 pages.
"Non-Final Office Action", U.S. Appl. No. 13/408,257, dated Dec. 5, 2013, 13 pages.
"Non-Final Office Action", U.S. Appl. No. 13/468,882, dated Jul. 9, 2014, 9 pages.
"Non-Final Office Action", U.S. Appl. No. 13/468,918, dated Dec. 26, 2013, 18 pages.
"Non-Final Office Action", U.S. Appl. No. 13/468,949, dated Jun. 20, 2014, 10 pages.
"Non-Final Office Action", U.S. Appl. No. 13/470,951, dated Jul. 2, 2014, 19 pages.
"Non-Final Office Action", U.S. Appl. No. 13/471,001, dated Feb. 19, 2013, 15 pages.
"Non-Final Office Action", U.S. Appl. No. 13/471,001, dated Jun. 17, 2014, 23 pages.
"Non-Final Office Action", U.S. Appl. No. 13/471,030, dated Jan. 15, 2015, 7 pages.
"Non-Final Office Action", U.S. Appl. No. 13/471,030, dated May 15, 2014, 10 pages.
"Non-Final Office Action", U.S. Appl. No. 13/471,054, dated Jun. 3, 2014, 15 pages.
"Non-Final Office Action", U.S. Appl. No. 13/471,139, dated Mar. 21, 2013, 12 pages.
"Non-Final Office Action", U.S. Appl. No. 13/471,186, dated Feb. 27, 2014, 8 pages.
"Non-Final Office Action", U.S. Appl. No. 13/471,202, dated Feb. 11, 2013, 10 pages.
"Non-Final Office Action", U.S. Appl. No. 13/471,237, dated Mar. 24, 2014, 7 pages.
"Non-Final Office Action", U.S. Appl. No. 13/471,282, dated Sep. 3, 2014, 13 pages.
"Non-Final Office Action", U.S. Appl. No. 13/471,336, dated Jan. 18, 2013, 14 pages.
"Non-Final Office Action", U.S. Appl. No. 13/471,336, dated May 7, 2014, 17 pages.
"Non-Final Office Action", U.S. Appl. No. 13/471,376, dated Apr. 2, 2014, 17 pages.
"Non-Final Office Action", U.S. Appl. No. 13/471,393, dated Oct. 20, 2014, 12 pages.
"Non-Final Office Action", U.S. Appl. No. 13/471,405, dated Feb. 20, 2014, 37 pages.
"Non-Final Office Action", U.S. Appl. No. 13/471,412, dated Jul. 11, 2014, 22 pages.
"Non-Final Office Action", U.S. Appl. No. 13/492,232, dated Feb. 24, 2015, 12 pages.

(56) References Cited

OTHER PUBLICATIONS

"Non-Final Office Action", U.S. Appl. No. 13/492,232, dated Apr. 30, 2014, 9 pages.
"Non-Final Office Action", U.S. Appl. No. 13/494,722, dated May 9, 2014, 8 pages.
"Non-Final Office Action", U.S. Appl. No. 13/525,614, dated Nov. 24, 2014, 19 pages.
"Non-Final Office Action", U.S. Appl. No. 13/527,263, dated Apr. 3, 2014, 6 pages.
"Non-Final Office Action", U.S. Appl. No. 13/527,263, dated Jul. 19, 2013, 5 pages.
"Non-Final Office Action", U.S. Appl. No. 13/563,435, dated Jun. 14, 2013, 6 pages.
"Non-Final Office Action", U.S. Appl. No. 13/564,520, dated Jan. 26, 2015, 6 pages.
"Non-Final Office Action", U.S. Appl. No. 13/564,520, dated Feb. 14, 2014, 5 pages.
"Non-Final Office Action", U.S. Appl. No. 13/564,520, dated Jun. 19, 2013, 8 pages.
"Non-Final Office Action", U.S. Appl. No. 13/564,520, dated Jun. 16, 2014, 5 pages.
"Non-Final Office Action", U.S. Appl. No. 13/565,124, dated Jun. 17, 2013, 5 pages.
"Non-Final Office Action", U.S. Appl. No. 13/595,700, dated Jun. 18, 2014, 8 pages.
"Non-Final Office Action", U.S. Appl. No. 13/599,635, dated Feb. 12, 2015, 16 pages.
"Non-Final Office Action", U.S. Appl. No. 13/647,507, dated Feb. 9, 2015, 37 pages.
"Non-Final Office Action", U.S. Appl. No. 13/647,507, dated Jun. 19, 2014, 22 pages.
"Non-Final Office Action", U.S. Appl. No. 13/651,195, dated Jan. 2, 2013, 14 pages.
"Non-Final Office Action", U.S. Appl. No. 13/651,232, dated Jan. 17, 2013, 15 pages.
"Non-Final Office Action", U.S. Appl. No. 13/651,232, dated Dec. 5, 2013, 15 pages.
"Non-Final Office Action", U.S. Appl. No. 13/651,272, dated Feb. 12, 2013, 10 pages.
"Non-Final Office Action", U.S. Appl. No. 13/651,287, dated Jan. 29, 2013, 13 pages.
"Non-Final Office Action", U.S. Appl. No. 13/651,304, dated Mar. 22, 2013, 9 pages.
"Non-Final Office Action", U.S. Appl. No. 13/651,327, dated Mar. 22, 2013, 6 pages.
"Non-Final Office Action", U.S. Appl. No. 13/651,726, dated Apr. 15, 2013, 6 pages.
"Non-Final Office Action", U.S. Appl. No. 13/651,871, dated Mar. 18, 2013, 14 pages.
"Non-Final Office Action", U.S. Appl. No. 13/651,871, dated Jul. 1, 2013, 5 pages.
"Non-Final Office Action", U.S. Appl. No. 13/651,976, dated Feb. 22, 2013, 16 pages.
"Non-Final Office Action", U.S. Appl. No. 13/651,976, dated Jun. 16, 2014, 23 pages.
"Non-Final Office Action", U.S. Appl. No. 13/653,321, dated Feb. 1, 2013, 13 pages.
"Non-Final Office Action", U.S. Appl. No. 13/653,682, dated Feb. 7, 2013, 11 pages.
"Non-Final Office Action", U.S. Appl. No. 13/653,682, dated Feb. 26, 2014, 10 pages.
"Non-Final Office Action", U.S. Appl. No. 13/653,682, dated Jun. 3, 2013, 14 pages.
"Non-Final Office Action", U.S. Appl. No. 13/656,055, dated Mar. 12, 2014, 17 pages.
"Non-Final Office Action", U.S. Appl. No. 13/656,055, dated Apr. 23, 2013, 11 pages.
"Non-Final Office Action", U.S. Appl. No. 13/714,401, dated Apr. 17, 2015, 14 pages.
"Non-Final Office Action", U.S. Appl. No. 13/714,401, dated Jul. 8, 2014, 11 pages.
"Non-Final Office Action", U.S. Appl. No. 13/773,496, dated Jun. 23, 2014, 10 pages.
"Non-Final Office Action", U.S. Appl. No. 13/780,228, dated Sep. 15, 2014, 18 pages.
"Non-Final Office Action", U.S. Appl. No. 13/780,228, dated Oct. 30, 2013, 12 pages.
"Non-Final Office Action", U.S. Appl. No. 13/786,233, dated Nov. 20, 2014, 13 pages.
"Non-Final Office Action", U.S. Appl. No. 13/938,930, dated Aug. 29, 2013, 9 pages.
"Non-Final Office Action", U.S. Appl. No. 13/939,002, dated Aug. 28, 2013, 6 pages.
"Non-Final Office Action", U.S. Appl. No. 13/939,002, dated Dec. 20, 2013, 5 pages.
"Non-Final Office Action", U.S. Appl. No. 13/939,032, dated Aug. 29, 2013, 7 pages.
"Non-Final Office Action", U.S. Appl. No. 14/063,912, dated Jan. 2, 2014, 10 pages.
"Non-Final Office Action", U.S. Appl. No. 14/063,912, dated Sep. 2, 2014, 11 pages.
"Non-Final Office Action", U.S. Appl. No. 14/147,252, dated Feb. 23, 2015, 11 pages.
"Non-Final Office Action", U.S. Appl. No. 14/199,924, dated Apr. 10, 2014, 6 pages.
"Non-Final Office Action", U.S. Appl. No. 14/200,595, dated Apr. 11, 2014, 4 pages.
"Non-Final Office Action", U.S. Appl. No. 14/225,250, dated Jun. 17, 2014, 5 pages.
"Non-Final Office Action", U.S. Appl. No. 14/225,276, dated Jun. 13, 2014, 6 pages.
"Non-Final Office Action", U.S. Appl. No. 14/277,240, dated Jun. 13, 2014, 6 pages.
"Notice of Allowance", U.S. Appl. No. 12/882,994, dated Jul. 12, 2013, 9 pages.
"Notice of Allowance", U.S. Appl. No. 13/367,812, dated Jan. 30, 2015, 8 pages.
"Notice of Allowance", U.S. Appl. No. 13/409,967, dated Feb. 14, 2014, 4 pages.
"Notice of Allowance", U.S. Appl. No. 13/468,918, dated Jun. 17, 2014, 5 pages.
"Notice of Allowance", U.S. Appl. No. 13/470,633, dated Mar. 22, 2013, 7 pages.
"Notice of Allowance", U.S. Appl. No. 13/471,030, dated Sep. 5, 2014, 6 pages.
"Notice of Allowance", U.S. Appl. No. 13/471,139, dated Mar. 17, 2014, 4 pages.
"Notice of Allowance", U.S. Appl. No. 13/471,186, dated Jul. 3, 2014, 7 pages.
"Notice of Allowance", U.S. Appl. No. 13/471,202, dated May 28, 2013, 7 pages.
"Notice of Allowance", U.S. Appl. No. 13/471,237, dated May 12, 2014, 8 pages.
"Notice of Allowance", U.S. Appl. No. 13/471,405, dated Jun. 24, 2014, 9 pages.
"Notice of Allowance", U.S. Appl. No. 13/494,722, dated Dec. 18, 2014, 7 pages.
"Notice of Allowance", U.S. Appl. No. 13/563,435, dated Nov. 12, 2013, 5 pages.
"Notice of Allowance", U.S. Appl. No. 13/565,124, dated Dec. 24, 2013, 6 pages.
"Notice of Allowance", U.S. Appl. No. 13/595,700, dated Jan. 21, 2015, 4 pages.
"Notice of Allowance", U.S. Appl. No. 13/647,507, dated Jun. 3, 2015, 7 pages.
"Notice of Allowance", U.S. Appl. No. 13/651,195, dated Jul. 8, 2013, 9 pages.
"Notice of Allowance", U.S. Appl. No. 13/651,232, dated Apr. 25, 2014, 9 pages.
"Notice of Allowance", U.S. Appl. No. 13/651,272, dated May 2, 2013, 7 pages.

(56) References Cited

OTHER PUBLICATIONS

"Notice of Allowance", U.S. Appl. No. 13/651,287, dated May 2, 2014, 6 pages.
"Notice of Allowance", U.S. Appl. No. 13/651,304, dated Jul. 1, 2013, 5 pages.
"Notice of Allowance", U.S. Appl. No. 13/651,327, dated Jun. 11, 2013, 7 pages.
"Notice of Allowance", U.S. Appl. No. 13/651,726, dated May 31, 2013, 5 pages.
"Notice of Allowance", U.S. Appl. No. 13/651,871, dated Oct. 2, 2013, 7 pages.
"Notice of Allowance", U.S. Appl. No. 13/651,976, dated Jan. 21, 2015, 10 pages.
"Notice of Allowance", U.S. Appl. No. 13/653,321, dated Dec. 18, 2013, 4 pages.
"Notice of Allowance", U.S. Appl. No. 13/653,682, dated Sep. 24, 2014, 4 pages.
"Notice of Allowance", U.S. Appl. No. 13/938,930, dated Feb. 20, 2014, 4 pages.
"Notice of Allowance", U.S. Appl. No. 13/939,002, dated Mar. 3, 2014, 4 pages.
"Notice of Allowance", U.S. Appl. No. 13/939,032, dated Apr. 3, 2014, 4 pages.
"Notice of Allowance", U.S. Appl. No. 14/018,286, dated May 23, 2014, 8 pages.
"Notice of Allowance", U.S. Appl. No. 14/199,924, dated Jun. 10, 2014, 4 pages.
"Notice of Allowance", U.S. Appl. No. 14/200,595, dated Feb. 17, 2015, 2 pages.
"Notice of Allowance", U.S. Appl. No. 14/200,595, dated Feb. 25, 2015, 4 pages.
"Notice of Allowance", U.S. Appl. No. 14/277,240, dated Sep. 16, 2014, 4 pages.
"Notice to Grant", CN Application No. 201320097089.9, dated Sep. 29, 2013, 2 Pages.
"Notice to Grant", CN Application No. 201320097124.7, dated Oct. 8, 2013, 2 pages.
"Position Sensors", Android Developers—retrieved from <http://developer.android.com/guide/topics/sensors/sensors_position.html> on May 25, 2012, 5 pages.
"Restriction Requirement", U.S. Appl. No. 13/468,918, dated Nov. 29, 2013, 6 pages.
"Restriction Requirement", U.S. Appl. No. 13/367,812, dated Mar. 11, 2014, 6 pages.
"Restriction Requirement", U.S. Appl. No. 13/471,139, dated Jan. 17, 2013, 7 pages.
"Restriction Requirement", U.S. Appl. No. 13/494,722, dated Dec. 20, 2013, 6 pages.
"Restriction Requirement", U.S. Appl. No. 13/595,700, dated May 28, 2014, 6 pages.
"Restriction Requirement", U.S. Appl. No. 13/651,304, dated Jan. 18, 2013, 7 pages.
"Restriction Requirement", U.S. Appl. No. 13/651,726, dated Feb. 22, 2013, 6 pages.
"Restriction Requirement", U.S. Appl. No. 13/651,871, dated Feb. 7, 2013, 6 pages.
"Restriction Requirement", U.S. Appl. No. 14/147,252, dated Dec. 1, 2014, 6 pages.
"SolRxTM E-Series Multidirectional Phototherapy ExpandableTM 2-Bulb Full Body Panel System", Retrieved from: < http://www.solarcsystems.com/us_multidirectional_uv_light_therapy_1_intro.html > on Jul. 5, 2012, 2011, 4 pages.
"Supplemental Notice of Allowance", U.S. Appl. No. 13/471,405, dated Aug. 29, 2014, 5 pages.
"Supplemental Notice of Allowance", U.S. Appl. No. 13/471,405, dated Dec. 17, 2014, 5 pages.
"Supplemental Notice of Allowance", U.S. Appl. No. 13/653,321, dated Mar. 28, 2014, 4 pages.
"Supplemental Notice of Allowance", U.S. Appl. No. 14/018,286, dated Jun. 11, 2014, 5 pages.

"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, Jun. 2012, 2 pages.
"Tilt Shift Lenses: Perspective Control", retrieved from http://www.cambridgeincolour.com/tutorials/tilt-shift-lenses1.htm, Mar. 28, 2008, 11 Pages.
"Virtualization Getting Started Guide", Red Hat Enterprise Linux 6, Edition 0.2—retrieved from <http://docs.redhat.com/docs/en-US/Red_Hat_Enterprise_Linux/6/html-single/Virtualization_Getting_Started_Guide/index.html> on Jun. 13, 2012, 24 pages.
"Welcome to Windows 7", Retrieved from: <http://www.microsoft.com/en-us/download/confirmation.aspx?id=4984> on Aug. 1, 2013, Sep. 16, 2009, 3 pages.
"What is Active Alignment?", http://www.kasalis.com/active_alignment.html, retrieved on Nov. 22, 2012, Nov. 22, 2012, 2 Pages.
"Written Opinion", Application No. PCT/US2014/020050, dated Sep. 22, 2014, 6 Pages.
Bert,"Passive Matrix Addressing of Electrophoretic Image Display", Conference on International Display Research Conference, Retrieved from <http://www.cmst.be/publi/eurodisplay2002_s14-1.pdf>, Oct. 1, 2002, 4 pages.
Block,"DeviceOrientation Event Specification", W3C, Editor's Draft, retrieved from <https://developer.palm.com/content/api/dev-guide/pdk/accessing-device-sensors.html> on May 25, 2012, Jul. 12, 2011, 14 pages.
Brown,"Microsoft Shows Off Pressure-Sensitive Keyboard", retrieved from <http://news.cnet.com/8301-17938_105-10304792-1.html> on May 7, 2012, Aug. 6, 2009, 2 pages.
Burge,"Determination of off-axis aberrations of imaging systems using on-axis measurements", SPIE Proceeding, Retrieved from <http://www.loft.optics.arizona.edu/documents/journal_articles/Jim_Burge_Determination_of_off-axis_aberrations_of_imaging_systems_using_on-axis_measurements.pdf>, Sep. 21, 2011, 10 pages.
Butler,"SideSight: Multi-"touch" Interaction around Small Devices", In the proceedings of the 21st annual ACM symposium on User interface software and technology., retrieved from <http://research.microsoft.com/pubs/132534/sidesight_crv3.pdf> on May 29, 2012, Oct. 19, 2008, 4 pages.
Chang,"Optical Design and Analysis of LCD Backlight Units Using ASAP", Optical Engineering, Available at <http://www.opticsvalley.com/resources/kbasePDF/ma_oe_001_optical_design.pdf>, Jun. 2003, 15 pages.
Crider,"Sony Slate Concept Tablet "Grows" a Kickstand", Retrieved from: <http://androidcommunity.com/sony-slate-concept-tablet-grows-a-kickstand-20120116/> on May 4, 2012, Jan. 16, 2012, 9 pages.
Dietz,"A Practical Pressure Sensitive Computer Keyboard", In Proceedings of UIST 2009, Oct. 2009, 4 pages.
DiVerdi,"An Immaterial Pseudo-3D Display with 3D Interaction", In the proceedings of Three-Dimensional Television: Capture, Transmission, and Display, Springer, Retrieved from <http://www.cs.ucsb.edu/~holl/pubs/DiVerdi-2007-3DTV.pdf>, Feb. 6, 2007, 26 pages.
Glatt,"Channel and Key Pressure (Aftertouch).", Retrieved from: <http://home.roadrunner.com/~jgglatt/tutr/touch.htm> on Jun. 11, 2012, 2012, 2 pages.
Grossman,"Multi-Finger Gestural Interaction with 3D Volumetric Displays", In the proceedings of the 17th annual ACM symposium on User interface software and technology, Retrieved from <http://www.dgp.toronto.edu/papers/tgrossman_UIST2004.pdf>, Oct. 24, 2004, 61-70.
Hanlon,"ElekTex Smart Fabric Keyboard Goes Wireless", Retrieved from: <http://www.gizmag.com/go/5048/ > on May 7, 2012, Jan. 15, 2006, 5 pages.
Harrison,"UIST 2009 Student Innovation Contest—Demo Video", Retrieved From: <https://www.youtube.com/watch?v=PDI8eYIASf0> Sep. 16, 2014, Jul. 23, 2009, 1 pages.
Izadi,"ThinSight: A Thin Form-Factor Interactive Surface Technology", Communications of the ACM, vol. 52, No. 12, retrieved from <http://research.microsoft.com/pubs/132532/p90-izadi.pdf> on Jan. 5, 2012, Dec. 2009, pp. 90-98.

(56) References Cited

OTHER PUBLICATIONS

Kaur,"Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012, Jun. 21, 2010, 4 pages.
Khuntontong,"Fabrication of Molded Interconnection Devices by Ultrasonic Hot Embossing on Thin Polymer Films", IEEE Transactions on Electronics Packaging Manufacturing, vol. 32, No. 3, Jul. 2009, pp. 152-156.
Lee,"Depth-Fused 3D Imagery on an Immaterial Display", In the proceedings of IEEE Transactions on Visualization and Computer Graphics, vol. 15, No. 1, Retrieved from <http://ieeexplore.ieee.org/stamp/stamp.jsp?arnumber=04540094>, Jan. 2009, 20-33.
Lee,"Flat-Panel Autostereoscopic 3D Display", Optoelectronics, IET, Available at <http://ieeexplore.ieee.org/stamp/stamp.jsp?arnumber=04455550>, Feb. 2008, pp. 24-28.
Lee,"LED Light Coupler Design for a Ultra Thin Light Guide", Journal of the Optical Society of Korea, vol. 11, Issue.3, Retrieved from <http://opticslab.kongju.ac.kr/pdf/06.pdf>, Sep. 2007, 5 pages.
Linderholm,"Logitech Shows Cloth Keyboard for PDAs", Retrieved from: <http://www.pcworld.com/article/89084/logitech_shows_cloth_keyboard_for_pdas.html> on May 7, 2012, Mar. 15, 2002, 5 pages.
Liu,"Three-dimensional PC: toward novel forms of human-computer interaction", In the proceedings of Three-Dimensional Video and Display: Devices and Systems vol. CR76, Retrieved from <http://www.google.co.in/url?sa=t&rct=j&q=Three-dimensional+PC:+toward+novel+forms+of+human-computer+interaction&source=web&cd=1&ved=0CFoQFjAA&url=http%3A%2F%2Fciteseerx.ist.psu.edu%2Fviewdoc%2Fdownload%3Fdoi%3D10.1.1.32.9469%26rep%3Drep1%26, Nov. 5, 2000, 250-281.
McLellan,"Eleksen Wireless Fabric Keyboard: a first look", Retrieved from: <http://www.zdnetasia.com/eleksen-wireless-fabric-keyboard-a-first-look-40278954.htm> on May 7, 2012, Jul. 17, 2006, 9 pages.
Peli,"Visual and Optometric Issues with Head-Mounted Displays", IS & T/OSA Optics & Imaging in the Information Age, The Society for Imaging Science and Technology, available at <http://www.u.arizona.edu/~zrui3/zhang_pHMPD_spie07.pdf>, 1996, pp. 364-369.
Post,"E-Broidery: Design and Fabrication of Textile-Based Computing", IBM Systems Journal, vol. 39, Issue 3 & 4, Jul. 2000, pp. 840-860.
Prospero,"Samsung Outs Series 5 Hybrid PC Tablet", Retrieved from: <http://blog.laptopmag.com/samsung-outs-series-5-hybrid-pc-tablet-running-windows-8> on Oct. 31, 2013, Jun. 4, 2012, 7 pages.
Purcher,"Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012, Retrieved from: <http://www.patentlyapple.com/patently-apple/2012/01/apple-is-paving-the-way-for-a-new-3d-gui-for-ios-devices.html> on Jun. 4, 2012, Jan. 12, 2012, 15 pages.
Reisman,"A Screen-Space Formulation for 2D and 3D Direct Manipulation", In the proceedings of the 22nd annual ACM symposium on User interface, Retrieved from <http://innovis.cpsc.ucalgary.ca/innovis/uploads/Courses/TableTopDetails2009/Reisman2009.pdf>, Oct. 4, 2009, 69-78.
Schoning,"Building Interactive Multi-Touch Surfaces", Journal of Graphics, GPU, and Game Tools, vol. 14, No. 3, available at <http://www.libavg.com/raw-attachment/wiki/Multitouch/Multitouchguide_draft.pdf>, Nov. 2009, pp. 35-55.
Takamatsu,"Flexible Fabric Keyboard with Conductive Polymer-Coated Fibers", In Proceedings of Sensors 2011, Oct. 28, 2011, 4 pages.
Travis,"Flat Projection for 3-D", In Proceedings of the IEEE, vol. 94 Issue: 3, Available at <http://ieeexplore.ieee.org/stamp/stamp.jsp?tp=&arnumber=1605201>, Mar. 13, 2006, pp. 539-549.
Yan,"Edge-Lighting Light Guide Plate Based on Micro-Prism for Liquid Crystal Display", Journal of Display Technology, vol. 5, No. 9, Available at <http://ieeexplore.ieee.org/ielx5/9425/5196834/05196835.pdf?tp=&arnumber=5196835&isnumber=5196834>, Sep. 2009, pp. 355-357.
Yu,"A New Driving Scheme for Reflective Bistable Cholesteric Liquid Crystal Displays", Society for Information Display International Symposium Digest of Technical Papers, Retrieved from <http://www.ee.ust.hk/~eekwok/publications/1997/bcd_sid.pdf>, May 1997, 4 pages.
Zhang,"Design of Head Mounted Displays", Retrieved at <<http://www.optics.arizona.edu/optomech/student%20reports/2007/Design%20of%20mounteddisplays%20Zhang.pdf>>, Dec. 12, 2007, 6 pages.
Zhang,"Model-Based Development of Dynamically Adaptive Software", In Proceedings of ICSE 2006, Available at <http://www.irisa.fr/lande/lande/icse-proceedings/icse/p371.pdf>, May 20, 2006, pp. 371-380.
"Examiner's Answer to Appeal Brief", U.S. Appl. No. 13/492,232, Feb. 9, 2017, 5 pages.
"Foreign Office Action", JP Application No. 2015-517278, dated Mar. 7, 2017, 5 pages.
"Foreign Office Action", EP Application No. 13730686.6, dated Mar. 27, 2017, 6 pages.
"Final Office Action", U.S. Appl. No. 13/773,496, dated Dec. 27, 2016, 18 pages.
"Foreign Notice of Allowance", CN Application No. 201380030964.4, dated Dec. 7, 2016, 4 pages.
"Foreign Office Action", EP Application No. 13728072.3, dated Jan. 2, 2017, 4 pages.
"Notice of Allowance", U.S. Appl. No. 13/786,233, dated Dec. 21, 2016, 8 pages.
"PTAB Decision", U.S. Appl. No. 13/408,257, Jan. 30, 2017, 8 pages.
"Foreign Office Action", CN Application No. 201480009664.2, dated Nov. 3, 2017, 11 pages.
"Foreign Notice of Allowance", JP Application No. 2015-517278, dated Oct. 24, 2017, 4 pages.
"Foreign Office Action", CN Application No. 201310225788.1, dated Sep. 20, 2017, 10 pages.
"Foreign Office Action", CN Application No. 2014800121118.4, dated Sep. 4, 2017, 14 pages.
"Foreign Notice of Allowance", JP Application No. 2014-560120, dated Sep. 29, 2017, 4 pages.
"Foreign Office Action", EP Application No. 13858283.8, dated Oct. 18, 2017, 4 pages.
"Office Action Issued in Japanese Patent Application No. 2017-106561", dated Feb. 27, 2018, 6 Pages.

* cited by examiner

700 ⟶

```
┌─────────────────────────────────────┐
│  Receive data corresponding to a    │
│         virtual image               │
│              702                    │
└─────────────────────────────────────┘
                  │
                  ▼
┌─────────────────────────────────────┐
│ Control an illuminator to inject    │
│ first light rays into a first       │
│ diffraction grating of a rod light  │
│ guide effective to diffract the     │
│ first light rays out of the rod     │
│ light guide at a first range of     │
│ angles and into a slab light guide  │
│ to generate the virtual image       │
│       with a wide field-of-view     │
│              704                    │
└─────────────────────────────────────┘
                  │
                  ▼
┌─────────────────────────────────────┐
│ Control the illuminator to inject   │
│ second light rays into a second     │
│ diffraction grating of the rod      │
│ light guide effective to diffract   │
│ the second light rays out of the    │
│ rod light guide at a second range   │
│ of angles and into a slab light     │
│ guide to generate the virtual image │
│      with the wide field-of-view    │
│              706                    │
└─────────────────────────────────────┘
```

Fig. 7

WIDE FIELD-OF-VIEW VIRTUAL IMAGE PROJECTOR

RELATED APPLICATIONS

This application is a divisional of and claims priority to U.S. patent application Ser. No. 13/494,722 titled "Wide Field-of-View Virtual Image Projector" and filed Jun. 12, 2012, the disclosure of which is incorporated in its entirety by reference herein.

BACKGROUND

A virtual image can be made by pointing a video projector into a light guide embossed with a grating to project the virtual image from a surface of the light guide. A pair of eyeglasses, or spectacles, can include a virtual image projector to project a virtual image in front of the eyes of a wearer of the eyeglasses. Virtual image projectors small enough to be placed on a pair of eyeglasses, however, typically project a virtual image with a narrow field-of-view.

SUMMARY

This document describes techniques and apparatuses for implementing a wide field-of-view virtual image projector. A wide field-of-view virtual image projector includes a rod light guide that is embossed with at least a first diffraction grating and a second diffraction grating that is substantially parallel to the first diffraction grating. The first diffraction grating is configured to receive first light rays, and to project first diffracted light rays from the rod light guide at a first range of angles. The second diffraction grating is configured to receive second light rays, and to project second diffracted light rays from the rod light guide at a second range of angles. The virtual image projector further includes a slab light guide configured to receive the first diffracted light rays and the second diffracted light rays, and to diffract the first diffracted light rays and the second diffracted light rays out of the slab light guide to generate a virtual image with a wide field-of view.

This summary is provided to introduce simplified concepts in a simplified form that are further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses for implementing a wide field-of-view virtual image projector are described with reference to the following drawings. The same numbers are used throughout the drawings to reference like features and components:

FIG. 7 illustrates an example method for controlling a wide field-of-view virtual image projector.

DETAILED DESCRIPTION

Overview

A virtual image can be made by pointing a video projector into a light guide embossed with a grating to project the virtual image from a surface of the light guide. A pair of eyeglasses, or spectacles, can include a virtual image projector to project a virtual image in front of the eyes of a wearer of the eyeglasses. A typical virtual image projector small enough to be placed on a pair of eyeglasses, however, projects a virtual image with a horizontal field-of-view of only 30 degrees.

This document describes techniques and apparatuses for implementing a wide field-of-view virtual image projector. A wide field-of-view virtual image projector includes a rod light guide that is embossed with at least a first diffraction grating and a second diffraction grating that is substantially parallel to the first diffraction grating. The first diffraction grating is configured to receive first light rays, and to project first diffracted light rays from the rod light guide at a first range of angles. The second diffraction grating is configured to receive second light rays, and to project second diffracted light rays from the rod light guide at a second range of angles. The virtual image projector further includes a slab light guide configured to receive the first diffracted light rays and the second diffracted light rays, and to diffract the first diffracted light rays and the second diffracted light rays out of the slab light guide to generate a virtual image with a wide field-of view.

In some embodiments, the virtual image projector may be coupled to a pair of eyeglasses to generate the virtual image with the wide field-of-view in front of a lens of the eyeglasses so that a wearer of the eyeglasses, looking through the lens of the eyeglasses, sees the virtual image.

Example Environment

Figure 1:
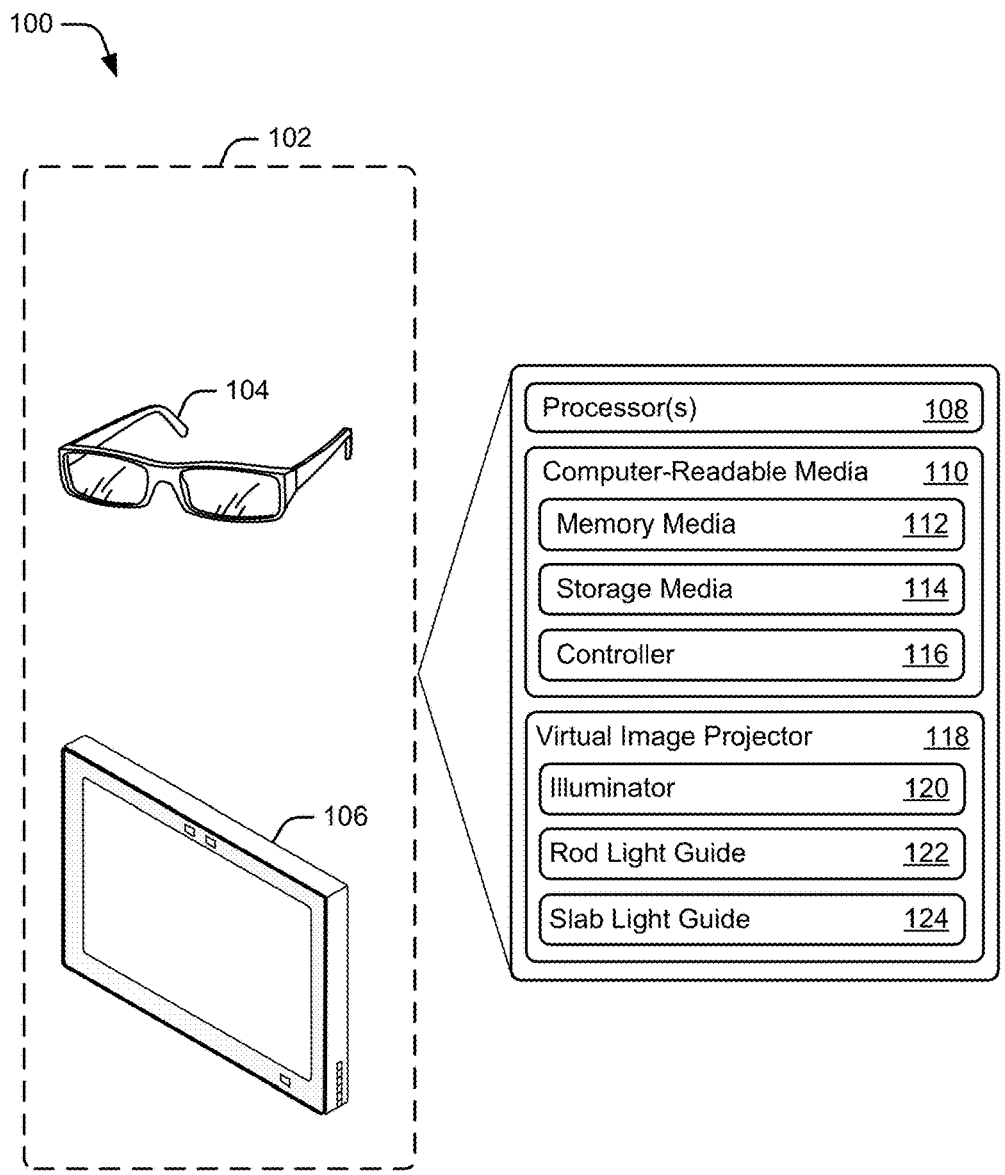
FIG. 1 illustrates an example environment in which a wide field-of-view virtual image projector can be implemented.

FIG. 1 is an illustration of an example environment 100 in which a wide field-of-view virtual image projector (herein a "virtual image projector") can be implemented. Environment 100 can be implemented in a virtual image display device 102, which is illustrated, by way of example and not limitation, as a head-mounted display device 104 or a flat-panel display device 106. Head-mounted display device 104 can include a pair of eyeglass, sunglasses, goggles, or any other type of head-mounted display device. Flat-panel display device 106 may include any type of flat-panel display device that can generate virtual, three-dimensional (3D), and/or multi-view images, such as a television, a desktop computer, a laptop, a mobile computing device, or a tablet computing device.

Virtual image display device 102 includes processor(s) 108 and computer-readable media 110, which includes memory media 112 and storage media 114. Computer-readable media 110 also includes a controller 116. How controller 116 is implemented and used varies, and is described as part of the methods discussed below.

Virtual image display device 102 also includes virtual image projector 118 that can be controlled by controller 116 to generate a wide field-of-view virtual image. When device 102 is implemented as head-mounted display device 104, virtual image projector 118 can be controlled to generate a wide field-of-view virtual image that can be viewed by a wearer of the head-mounted display device, referred to as "viewer" herein. For example, virtual image projector 118 may be coupled to the lens of a pair of eyeglasses to generate a virtual image of infinitely distant objects directly in front of the viewer's eye to cause a lens of the viewer's eye to adjust to an infinite or near-infinite focal length to focus on the objects. Virtual image projector 118 may be at least partially transparent so that the viewer can see external objects as well as virtual images when looking through a lens of head-mounted display device 104. In addition, it is to be appreciated that virtual image projector 118, in some embodiments, may be small enough to fit onto the lens of a pair of eyeglasses without being noticeable to a viewer wearing the eyeglasses.

In some cases, virtual image projector 118 can be implemented as two projectors to generate a virtual image in front of each of the viewer's eyes. When two projectors are used, each virtual image projector 118 can project the same virtual image concurrently so that the viewer's right eye and left eye receive the same image at the same time. Alternately, the projectors may project slightly different images concurrently, so that the viewer receives a stereoscopic image (e.g., a three-dimensional image). For purposes of this discussion, however, virtual image projector 118 will be described as a single projector that generates a single virtual image.

Virtual image projector 118 includes an illuminator 120, a rod light guide 122, and a slab light guide 124. In some embodiments, rod light guide 122 and slab light guide 124 are polyhedral waveguides that transmit light by total internal reflection. The length of rod light guide 122 is substantially equal to the length of slab light guide 124. The height, however, of slab light guide 124 is significantly greater than the height of rod light guide 122. It is to be appreciated, however, that rod light guide 122 and slab light guide 124 are not limited to any specific size or shape.

Illuminator 120 can include a red laser, green laser, and blue laser. The red, green, and blue lasers may be semiconductor lasers, such as low-power diode lasers, or any other suitable lasers. The red, green, and blue lasers can be independently biased and modulated by controller 116. Illuminator 120 may also include merging optics that are configured to merge the monochromatic emission from each of the lasers to form a beam or ray of light. As described herein, the term "light ray" will be used to describe a "beam" or "ray" of light emitted by illuminator 120.

Figure 2:
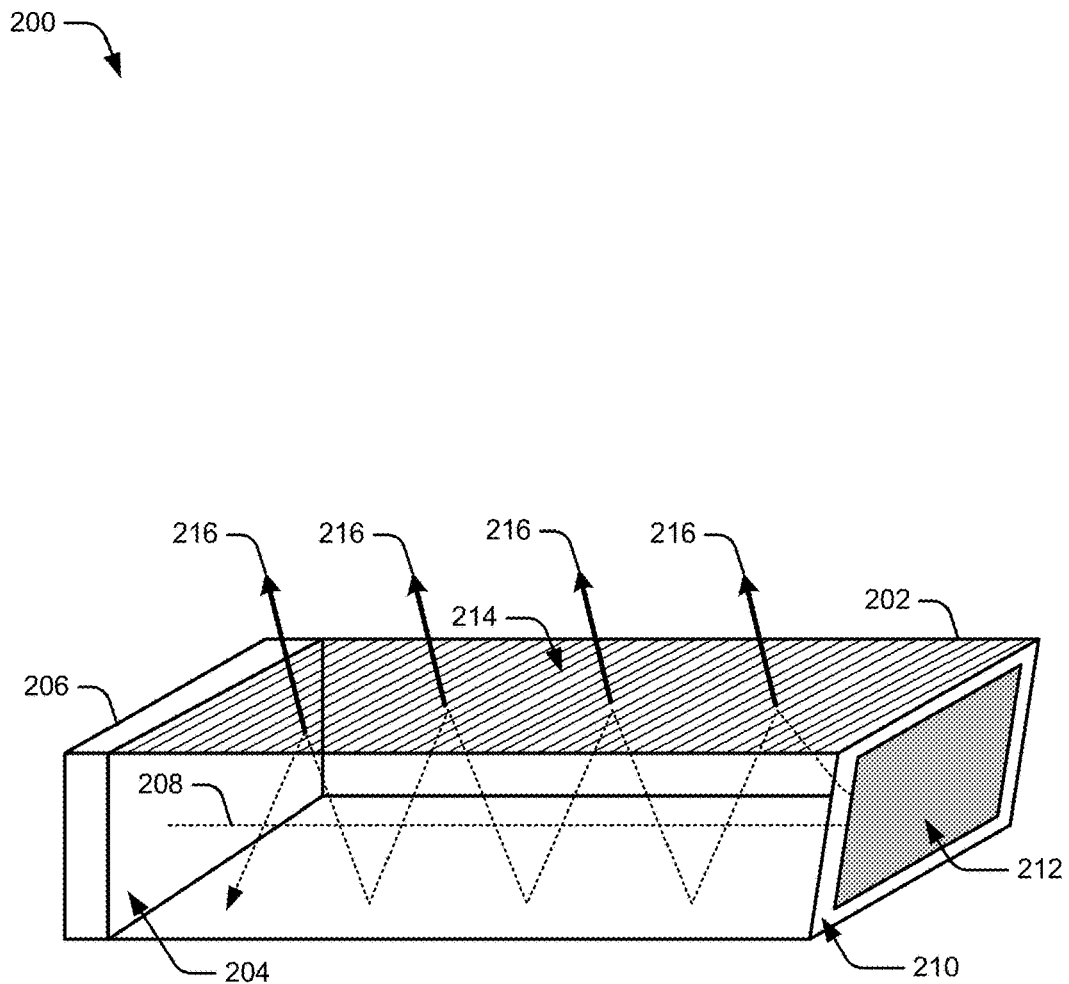
FIG. 2 illustrates an example light guide embossed with a single diffraction grating.

FIG. 2 illustrates an example 200 of a light guide 202 embossed with a single diffraction grating. In this example, an end face 204 of light guide 202 is positioned adjacent an illuminator 206 and is configured to receive a light ray 208 from illuminator 206. Light ray 208 passes through light guide 202 to opposite end face 210, where it encounters a redirection optic 212. Redirection optic 212 can be implemented as mirror or refractive structure, and is configured to vary an angle at which light rays are injected into light guide 202. In this example, redirection optic 212 reflects light ray 208 back into light guide 202 at an angle greater than the critical angle for total internal reflection. After reflecting off of redirection optic 212, light ray 208 propagates away from opposite end face 210 by total internal reflection. However, each time light ray 208 encounters a diffraction grating 214, part of light ray 208 is diffracted out of light guide 202 to form parallel diffracted light rays 216.

Figure 3:
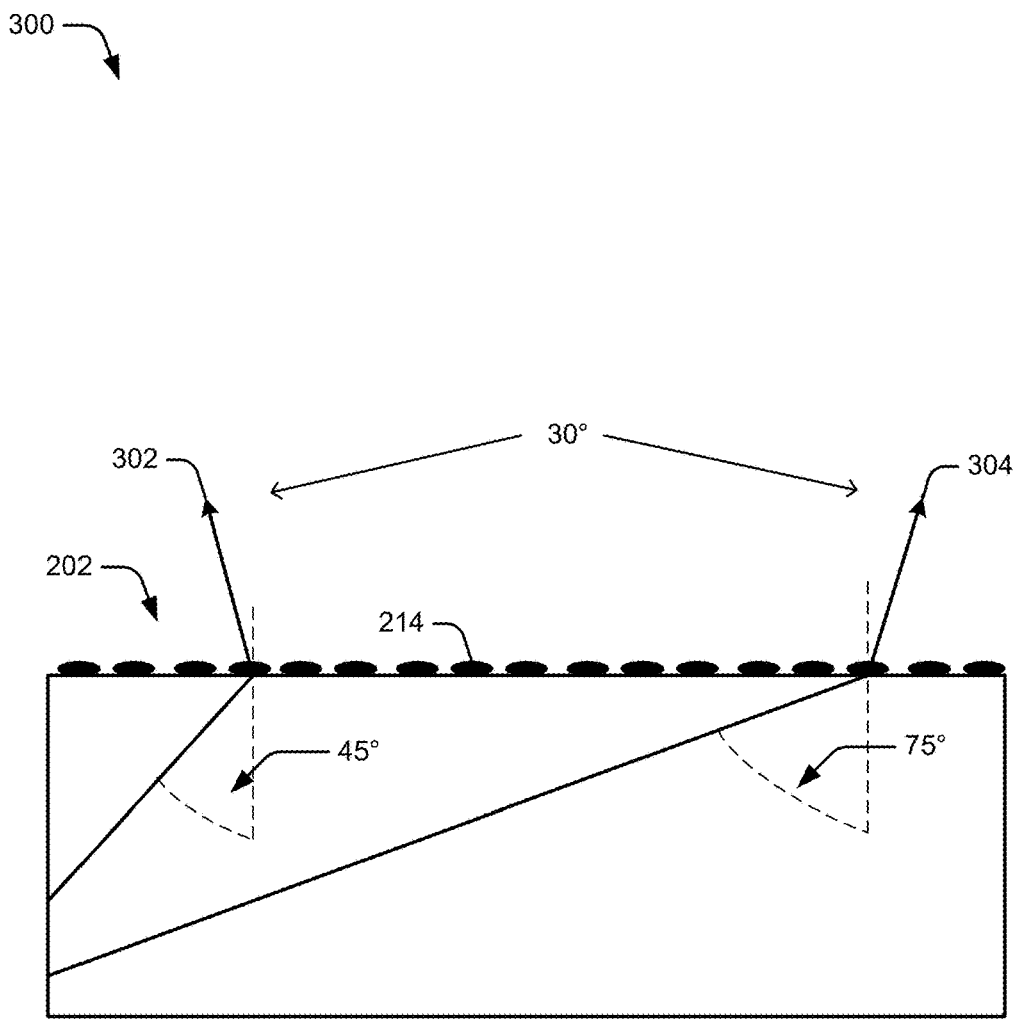
FIG. 3 illustrates an example of the field-of-view of a light guide embossed with a single diffraction grating.

Light guide 202 projects diffracted light rays with a narrow field-of-view in the horizontal plane because it is equipped with a single diffraction grating. Consider, for example, FIG. 3, which illustrates an example 300 of the field-of-view light guide 202 embossed with single diffraction grating 214. In FIG. 3, a first light ray 302 exits light guide 202 when it encounters diffraction grating 214 if it exceeds the critical angle, which is approximately 45 degrees. Additionally, a second light ray 304 propagating at an angle of more than 75° may also exit light guide 202 when it encounters diffraction grating 214. The range of angles at which single diffraction grating 214 of light guide 202 projects light rays, therefore, is approximately 30 degrees. This range of angles is substantially equal to the field-of-view of light guide 202. In accordance with various embodiments, therefore, rod light guide 122 is configured with at least two diffraction gratings that enable virtual image projector 118 to generate virtual images with a wide field-of-view in the horizontal direction.

Figure 4:
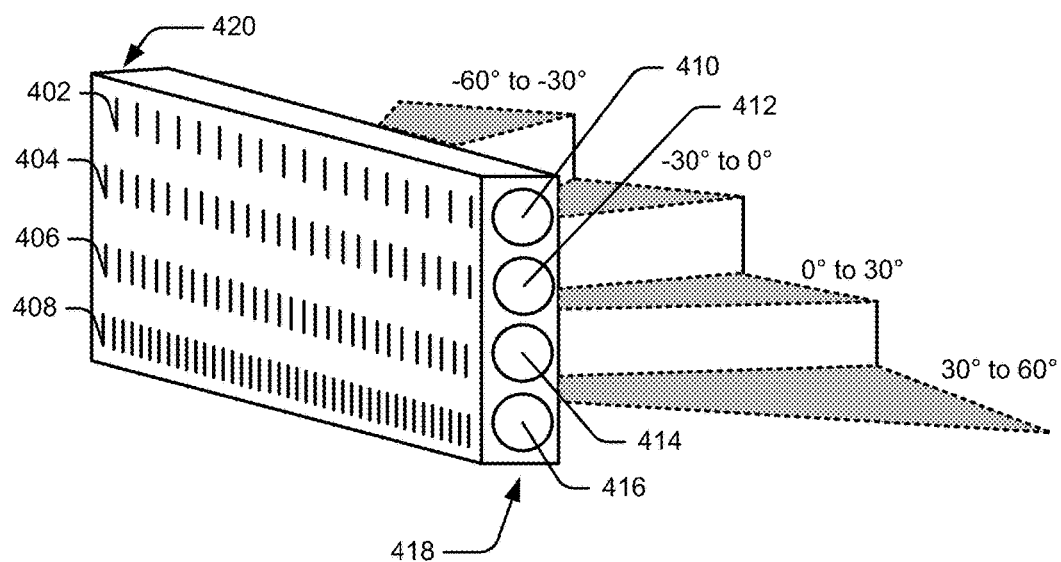
FIG. 4 illustrates a more-detailed example of a rod light guide of a virtual image projector.

FIG. 4 illustrates a detailed example of rod light guide 122 of virtual image projector 118. In this example, rod light guide 122 is embossed with diffraction gratings 402, 404, 406, and 408. It is to be noted, however, that rod light guide 122 may be embossed with less than or more than four different diffraction gratings. In one embodiment, for example, rod light guide 122 is embossed with two diffraction gratings. Gratings 402, 404, 406, and 408 are oriented substantially parallel to each other, and are each configured to receive a separate light ray at 410, 412, 414, and 416, respectively, of end face 418 of rod light guide 122 from illuminator 120 (not pictured). In an embodiment, rod light guide 122 is a single rod light guide (e.g., a single piece of glass). For example, diffraction gratings 402, 404, 406, and 408 can be embossed onto a single rod light guide. Alternately, rod light guide 122 may include multiple rod light guides stacked side by side, where each rod is embossed with a different diffraction grating. For example, a rod light guide embossed with diffraction grating 402 can be stacked next to a rod light guide embossed with diffraction grating 404, and so on.

Each of gratings 402, 404, 406, and 408 acts similar to diffraction grating 214 of light guide 202 illustrated in FIG. 2. For example, a light ray received at 410 of end face 418 passes through rod light guide 122 to opposite end face 420, where it encounters a first redirection optic (not pictured). Like redirection optic 212 of FIG. 2, first redirection optic can be implemented as a reflective mirror or refractive structure, and is configured to vary an angle at which light rays are injected into rod light guide 122. In this example, the first redirection optic reflects the light ray back into rod light guide 122 at an angle greater than the critical angle for total internal reflection. After reflecting off of the first redirection optic, the light ray propagates away from opposite end face 420 by total internal reflection. The light ray travels parallel to the sides of rod light guide 122 while reflecting off of the surface embossed with diffraction grating 402 and the surface opposite diffraction grating 402. However, each time the light ray encounters diffraction grating 402, part of the light ray is diffracted out of rod light guide 122 to form parallel diffracted light rays, as shown in FIG. 2. Similarly, each time a light ray injected at 412, 414, or 416 encounters diffraction grating 404, 406, or 408, respectively, part of the light ray is diffracted out of rod light guide 122 to form parallel diffracted light rays, as shown in FIG. 2.

In some embodiments, virtual image projector 118 also includes a second redirection optic (not pictured), which overlays the surface of rod light guide 122 that is embossed with the diffraction gratings. The second redirection optic is configured to reflect the diffracted light rays back through rod light guide 122 and out of the surface opposite the diffraction gratings of rod light guide 122. It is to be noted that gratings 402, 404, 406, and 408 are weak, so they do not alter the diffracted light rays reflected back through rod light guide 122. As will be described in more detail below, the second redirection optic directs the diffracted light rays into slab light guide 124.

In accordance with various embodiments, the spatial frequencies of diffraction gratings 402, 404, 406, and 408 differ so that the diffracted light rays projected from each diffraction grating is projected at a different range of angles. In this example, grating 408 has a pitch short enough to project diffracted light rays at a range of angles between 30 degrees and 60 degrees to the surface normal. In contrast, grating 402 has a pitch long enough to project diffracted light rays at a range of angles between −60 degrees and −30 degrees. Similarly, grating 406 is configured to project diffracted light rays at a range of angles between 0 degrees to 30 degrees, and grating 404 is configured to project diffracted light rays at a range of angles between −30 and 0 degrees. Together, the different ranges of angles combine to form a wide field-of-view in the horizontal direction. In FIG. 4, for example, each diffraction grating projects light at a range of angles equal to 30 degrees. By using four diffraction gratings, therefore, the total range of angles is equal to 120 degrees. This enables rod light guide 122 to project light with a wide-field-of-view in the horizontal direction equal to 120 degrees. In embodiments, the ranges may overlap to smooth out any discontinuities.

Figure 5:
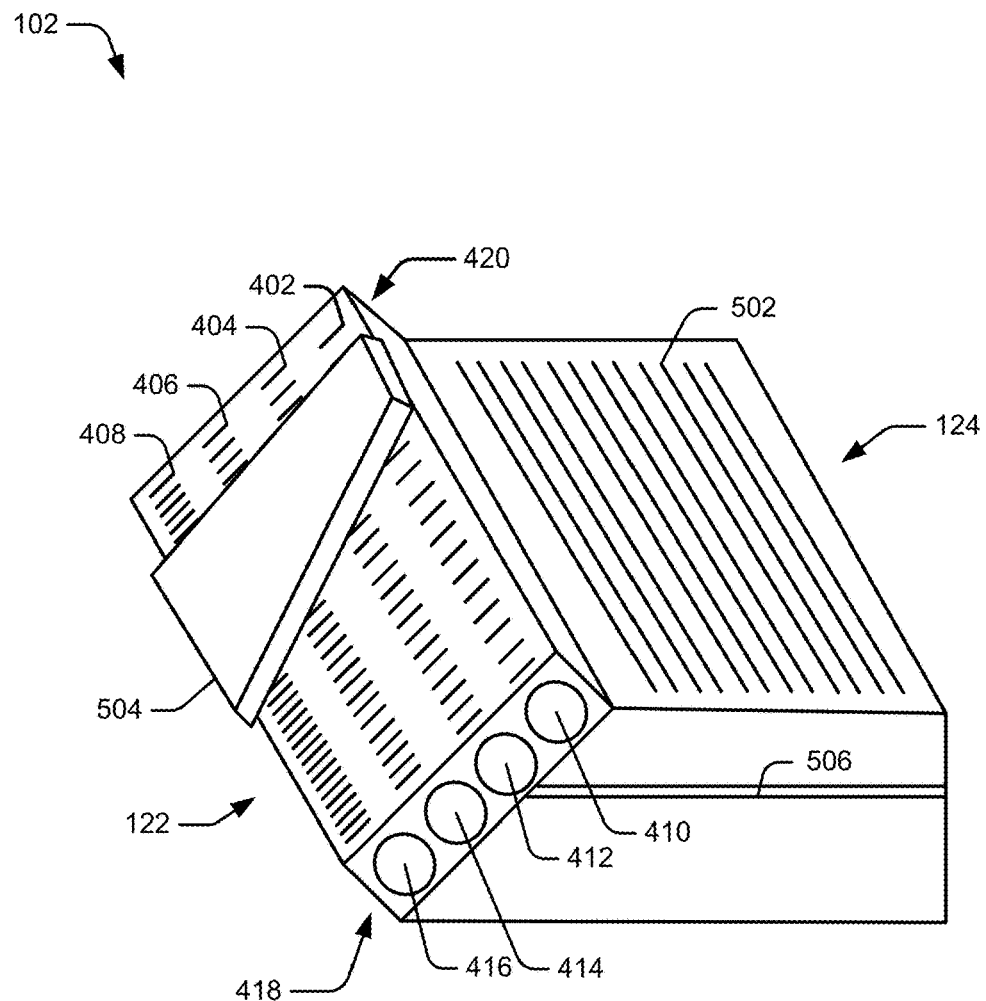
FIG. 5 illustrates a more-detailed example of a rod light guide and a slab light guide of a virtual image projector.

In some embodiments, in order to generate a virtual image with a wide field-of-view, the output from rod light guide 122 is injected into slab light guide 124. FIG. 5 illustrates a more-detailed example of rod light guide 122 and slab light guide 124 of virtual image display device 102. In an embodiment, rod light guide 122 and slab light guide 124 may be a single piece of glass. In other embodiments, however, rod light guide 122 and slab light guide 124 are each separate light guides. As illustrated in FIG. 4, the length of rod light guide 122 is substantially equal to the length of slab light guide 124. The height, however, of slab light guide 124 is significantly greater than the height of rod light guide 122. In this example, the surface opposite the diffraction gratings of rod light guide 122 is oriented towards an entry surface of slab light guide 124. Slab light guide 124 is embossed with a diffraction grating 502 that is substantially perpendicular to diffraction gratings 402, 404, 406, and 408 of rod light guide 122. As described above, a second redirection optic 504 is configured to reflect diffracted light rays from rod light guide 122 into slab light guide 124. Second redirection optic 504 is shown partially cut off in FIG. 5, but it is to be appreciated that second redirection optic 504 runs the whole length of rod light guide 122. Slab light guide 124 receives the diffracted light rays from rod light guide 122, and projects the light rays to form a virtual image with a wide field-of-view.

It is to be noted that slab light guide 124 is thick enough to receive all the light from rod light guide 122 after it has reflected off of second redirection optic 504. However, light from any one grating of rod light guide 122 only partially fills a pupil of the slab. Thus, once the light rays have passed into slab light guide 124, they interact intermittently with diffraction grating 502 and therefore illuminate it at intervals. In some embodiments, therefore, slab light guide 124 is further configured with a partially-reflecting mirror 506.

In this example, partially-reflecting mirror 506 is inserted into a plane of slab light guide 124 that is substantially parallel to the surface embossed with diffraction grating 502. Partially-reflecting mirror 506 is configured to reflect a portion, and transmit another portion, of each light ray that comes into contact with the partially-reflecting mirror.

Figure 6:
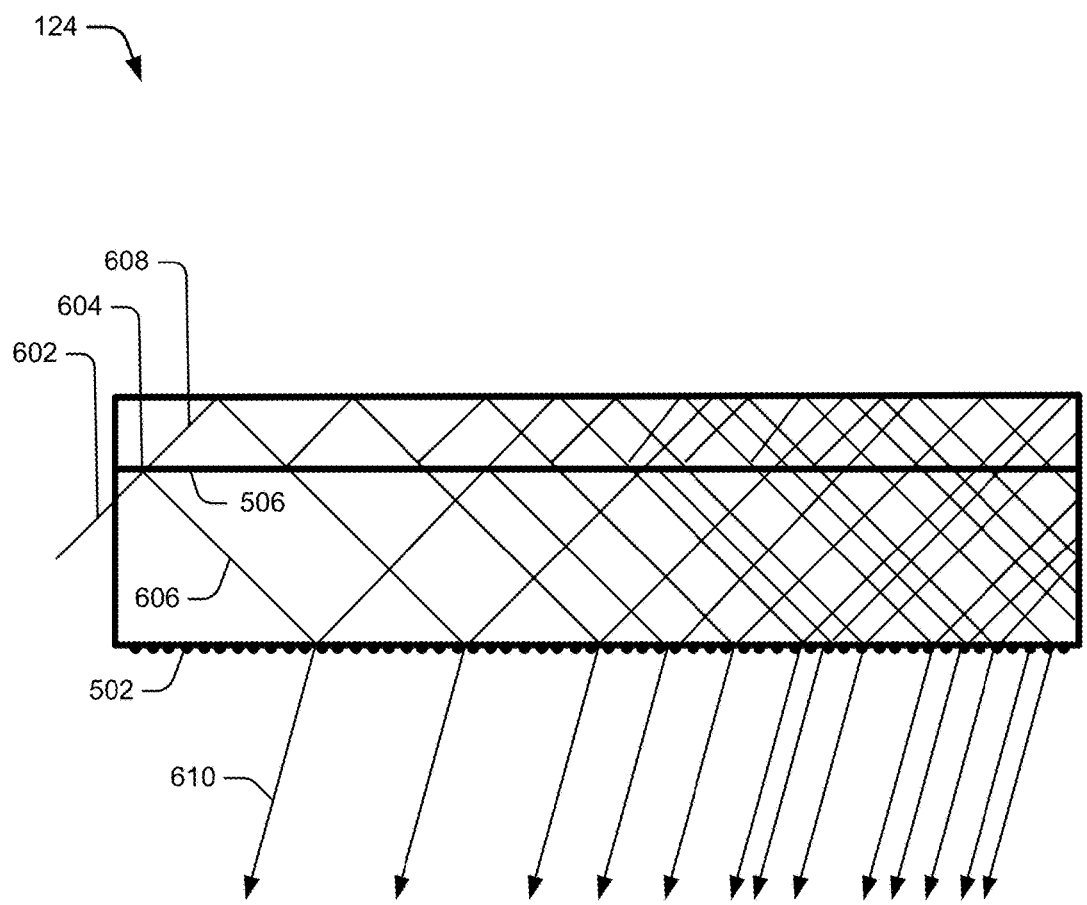
FIG. 6 illustrates a more-detailed example of a slab light guide of a virtual image projector.

By reflecting a portion, and transmitting another portion, of each light ray, partially-reflecting mirror 506 turns a single light ray into multiple light rays to ensure that the light projected by slab light guide 124 is uniform across its surface. Consider for example FIG. 6, which illustrates another view of slab light guide 124. In this example, a light ray 602 injected into slab light guide 124 encounters partially-reflecting mirror 506 at 604. When this occurs, partially-reflecting mirror 506 reflects a portion of light ray 602 towards the surface embossed with diffraction grating 502 as light ray 606, and transmits another portion of light ray 602 towards the surface opposite the diffraction gratings as light ray 608. Then, when light ray 606 comes into contact with diffraction grating 502, a portion of light ray 606 is projected from slab light guide 124 as diffracted light ray 610. This process then continues, where each time a light ray strikes partially-reflecting mirror 506 a portion is reflected, and another portion is transmitted. Thus, as illustrated by FIG. 6, partially-reflecting mirror 506 enables slab light guide 124 to turn one light ray into multiple light rays to project a virtual image with a wide field-of-view.

Example Method

FIG. 7 is flow diagram depicting an example method 700 for controlling a virtual image projector to generate a virtual image with a wide field-of-view. Block 702 receives data corresponding to a virtual image (e.g., video data corresponding to a movie or to television programming). For example controller 116 (FIG. 1) receives data corresponding to a virtual image.

Block 704 controls an illuminator to inject first light rays into a first diffraction grating of a rod light guide effective to diffract the first light rays out of the rod light guide at a first range of angles and into a slab light guide to generate the virtual image with a wide field-of-view. For example, controller 116 controls illuminator 120 to inject first light rays into first diffraction grating 402 (FIG. 5) of rod light guide 122 effective to diffract the first light rays out of rod light guide 122 at a first range of angles and into slab light guide 124 to generate the virtual image with a wide field-of-view.

Block 706 controls the illuminator to inject second light rays into a second diffraction grating of the rod light guide effective to diffract the second light rays out of the rod light guide at a second range of angles and into a slab light guide to generate the virtual image with the wide field-of-view. For example, controller 116 controls illuminator 120 to inject second light rays into second diffraction grating 404 (FIG. 5) of rod light guide 122 effective to diffract the second light rays out of rod light guide 122 at a second range of angles and into slab light guide 124 to generate the virtual image with the wide field-of-view. In various embodiments, the wide field-of-view of the virtual image is equal to the sum of the first range of angles and the second range of angles.

Example Device

Figure 8:
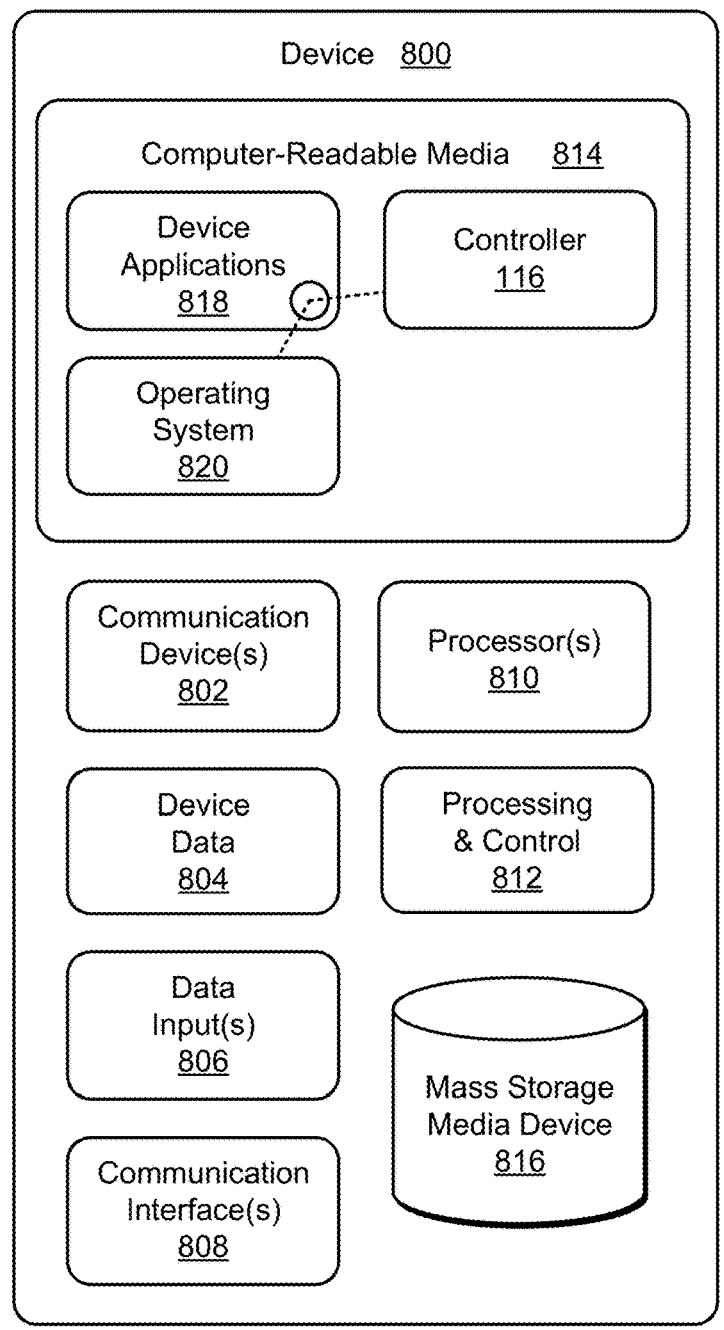
FIG. 8 illustrates an example device in which techniques for a wide field-of-view virtual image projector can be implemented.

FIG. 8 illustrates various components of example device 800 that can be implemented as any type of client, server, and/or display device as described with reference to the previous FIGS. 1-7 to implement techniques enabling a wide field-of-view virtual image projector. In embodiments, device 800 can be implemented as one or a combination of a wired and/or wireless device, a head-mounted display device (e.g., eyeglasses, sunglasses, etc.) as a form of flat panel display, television, television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 800 may also be associated with a viewer (e.g., a person or user) and/or an entity that operates the device such that a device describes logical devices that include users, software, firmware, and/or a combination of devices.

Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808, which can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like), which process various computer-executable instructions to control the operation of device 800 and to enable techniques for implementing a wide field-of-view virtual image projector. Alternatively or in addition, device 800 can be implemented with any one or combination of hardware, firmware, a system-on-chip (SoC), or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable storage media 814, such as one or more memory devices that enable persistent and/or non-transitory data storage (i.e., in contrast to mere signal transmission), examples of which include random access memory (RAM), non-volatile memory (e.g., any one or more of a read-only memory (ROM), non-volatile RAM (NVRAM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable storage media 814 provides data storage mechanisms to store the device data 804, as well as various device applications 818 and any other types of information and/or data related to operational aspects of device 800. For example, an operating system 820 can be maintained as a computer application with the computer-readable storage media 814 and executed on processors 810. The device applications 818 may include a device manager, such as any form of a control application, software application, signal-processing and control module, code that is native to a particular device, a hardware abstraction layer for a particular device, and so on.

The device applications 818 also include any system components or modules to implement techniques using or enabling a wide field-of-view virtual image projector. In this example, the device applications 818 can include controller 116 for controlling a wide field-of-view virtual image projector.

CONCLUSION

This document describes various apparatuses and techniques for implementing a wide field-of-view virtual image projector. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving data corresponding to a virtual image;
controlling an illuminator to inject first light rays into a first diffraction grating of a rod light guide effective to diffract the first light rays out of the rod light guide at a first range of angles and into a slab light guide; and
controlling the illuminator to inject second light rays into a second diffraction grating of the rod light guide effective to diffract the second light rays out of the rod light guide at a second range of angles and into the slab light guide, the first diffraction grating substantially parallel to the second diffraction grating on a first surface of the rod light guide, the first diffraction grating having a first spatial frequency that is different than a second spatial frequency of the second diffraction grating, the first spatial frequency causing the first diffraction grating to project the first diffracted light rays at the first range of angles, and the second spatial frequency causing the second diffraction grating to project the second diffracted light rays at the second range of angles, and the slab light guide configured to generate the virtual image.

2. The method as described in claim 1, wherein the slab light guide is configured to generate the virtual image with a field-of-view that is equal to the sum of the first range of angles and the second range of angles.

3. The method as described in claim 1, wherein the first range of angles is different than the second range of angles.

4. The method as described in claim 1, further comprising:
controlling the illuminator to inject third light rays into a third diffraction grating of the rod light guide effective to diffract the third light rays out of the rod light guide at a third range of angles and into the slab light guide.

5. The method as described in claim 4, further comprising:
controlling the illuminator to inject fourth light rays into a fourth diffraction grating of the rod light guide effective to diffract the fourth light rays out of the rod light guide at a fourth range of angles and into the slab light guide.

6. The method as described in claim 5, wherein the slab light guide generates the virtual image with a field-of-view that is equal to the sum of the first range of angles, the second range of angles, the third range of angles, and the fourth range of angles.

7. The method as described in claim 5, wherein: the first range of angles is approximately −60 degrees to −30 degrees, the second range of angles is approximately −30 degrees to 0 degrees, the third range of angles is approximately 0 degrees to 30 degrees, the fourth range of angles is approximately 30 degrees to 60 degrees.

8. The method as described in claim 1, wherein the slab light guide is configured to generate the virtual image with a field-of-view that is approximately 120 degrees.

9. The method as described in claim 1, wherein the slab light guide is embossed with a third diffraction grating that is substantially perpendicular to the first diffraction grating and the second diffraction grating, the third diffraction grating configured to cause the first diffracted light rays and the second diffracted light rays to be projected out of the slab light guide to generate the virtual image.

10. The method as described in claim 1, wherein the slab light guide is configured with a partially-reflecting mirror that is configured to reflect a portion, and transmit another portion, of each of the first diffracted light rays and the second diffracted light rays.

11. One or more computer-readable storage media comprising instructions stored thereon that, responsive to execution by one or more processors, perform operations comprising:
receiving data corresponding to a virtual image;
controlling an illuminator to inject first light rays into a first diffraction grating of a rod light guide effective to diffract the first light rays out of the rod light guide at a first range of angles and into a slab light guide;
controlling the illuminator to inject second light rays into a second diffraction grating of the rod light guide effective to diffract the second light rays out of the rod light guide at a second range of angles and into the slab light guide, the first diffraction grating substantially parallel to the second diffraction grating on a first surface of the rod light guide, the first diffraction grating having a first spatial frequency that is different than a second spatial frequency of the second diffraction grating, the first spatial frequency causing the first diffraction grating to project the first diffracted light rays at the first range of angles, and the second spatial frequency causing the second diffraction grating to project the second diffracted light rays at the second range of angles, and the slab light guide configured to generate the virtual image.

12. The one or more computer-readable storage media of claim 11, wherein the slab light guide is configured to generate the virtual image with a field-of-view that is equal to the sum of the first range of angles and the second range of angles.

13. The one or more computer-readable storage media of claim 11, wherein the first range of angles is different than the second range of angles.

14. The one or more computer-readable storage media of claim 11, wherein the operations further comprise controlling the illuminator to inject third light rays into a third diffraction grating of the rod light guide effective to diffract the third light rays out of the rod light guide at a third range of angles and into the slab light guide.

15. The one or more computer-readable storage media of claim 14, wherein the operations further comprise controlling the illuminator to inject fourth light rays into a fourth diffraction grating of the rod light guide effective to diffract the fourth light rays out of the rod light guide at a fourth range of angles and into the slab light guide.

16. The one or more computer-readable storage media of claim 15, wherein the slab light guide generates the virtual image with a field-of-view that is equal to the sum of the first range of angles, the second range of angles, the third range of angles, and the fourth range of angles.

17. The one or more computer-readable storage media of claim 15, wherein: the first range of angles is approximately −60 degrees to −30 degrees, the second range of angles is approximately −30 degrees to 0 degrees, the third range of angles is approximately 0 degrees to 30 degrees, the fourth range of angles is approximately 30 degrees to 60 degrees.

18. The one or more computer-readable storage media of claim 11, wherein the slab light guide is embossed with a third diffraction grating that is substantially perpendicular to the first diffraction grating and the second diffraction grating, the third diffraction grating configured to cause the first diffracted light rays and the second diffracted light rays to be projected out of the slab light guide to generate the virtual image.

19. The one or more computer-readable storage media of claim 11, wherein the slab light guide is configured to generate the virtual image with a field-of-view that is approximately 120 degrees.

20. The one or more computer-readable storage media of claim 11, wherein the slab light guide is configured with a partially-reflecting mirror that is configured to reflect a portion, and transmit another portion, of each of the first diffracted light rays and the second diffracted light rays.

* * * * *